(12) United States Patent
Takaya et al.

(10) Patent No.: US 8,240,737 B2
(45) Date of Patent: Aug. 14, 2012

(54) PICK-UP STYLE UTILITY VEHICLE WITH EXPANDABLE CARGO BED

(75) Inventors: Satoshi Takaya, Akashi (JP); Masafumi Inoue, Miki (JP); Shinichi Tanba, Kobe (JP); Daisuke Takagi, Kakogawa (JP); Masahiro Koga, Kobe (JP); Yoshitaka Nishikawa, Osaka (JP); Takao Kawabata, Kobe (JP); Dave Reinke, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 301 days.

(21) Appl. No.: 12/646,041

(22) Filed: Dec. 23, 2009

(65) Prior Publication Data
US 2011/0148146 A1    Jun. 23, 2011

(51) Int. Cl.
*B62D 25/00* (2006.01)
(52) U.S. Cl. .................. 296/65.09; 296/26.1; 296/26.09
(58) Field of Classification Search .................. 296/26.1, 296/26.09, 26.11, 65.09, 183.1
See application file for complete search history.

(56) References Cited

U.S. PATENT DOCUMENTS

| 6,905,159 | B1 | 6/2005 | Saito et al. |
| 6,994,388 | B2 | 2/2006 | Saito et al. |
| 7,249,798 | B2 | 7/2007 | Saito et al. |

*Primary Examiner* — Joseph Pape
(74) *Attorney, Agent, or Firm* — Wenderoth, Lind & Ponack, LLP

(57) ABSTRACT

A pick-up style utility vehicle with an expandable cargo bed, including a front seat, a rear seat, a stationary bottom plate serving as a bottom face of the cargo bed, an expansion bottom plate for expanding the bottom face of the cargo bed, and a shared linkage mechanism for holding the rear seat at a use position where the rear seat is positioned on the upper side of the stationary bottom plate and a shunting position where the rear seat is shunted into a rear leg room provided in front of and below the stationary bottom plate. The shared linkage mechanism also holds the expansion bottom plate at a storage position where the expansion bottom plate is above the stationary bottom plate and an expansion position where the expansion bottom plate is positioned over the leg room.

4 Claims, 24 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle with a cargo bed which is expandable forward for making the most of space for the cargo bed and a ride space according to needs of a user.

2. Description of the Related Art

In general, a pick-up style utility vehicle is provided with a relatively large cargo bed in a rear section of a seat in comparison to a handlebar style utility vehicle belonging to an all terrain vehicle. Therefore, the pick-up style utility vehicle is used in wider practical fields of uses such as transport in golf links, maintenance of the golf links, hunting and conveyance of wood materials in comparison to the handlebar style utility vehicle.

The applicant previously filed applications for the inventions relating to a pick-up style utility vehicle with an expandable cargo bed, and those applications were registered. For example, the inventions include U.S. Pat. Nos. 6,905,159, 6,994,388, and 7,249,798.

FIG. 27 shows a pick-up style utility vehicle 901 as shown in the patent literatures described above. The pick-up style utility vehicle 901 is provided with a front seat 902, a rear seat 903, a cargo bed CN, and a chassis 906. The cargo bed CN includes a stationary bottom plate 907 and a plate portion 904 arranged on the stationary bottom plate 907. A front leg room R2 is provided on the front lower side of the front seat 902, and a rear leg room R3 is provided on the front lower side of the rear seat 903. The pick-up style utility vehicle 901 is switchable between a normal state in which the vehicle is used as a four-seater vehicle and an expanded state in which the vehicle is used as a two-seater vehicle with an expanded cargo bed. A screen 905 is arranged on the stationary bottom plate 907 between the plate portion 904 and the rear seat 903.

FIG. 28 is a side view showing the pick-up style utility vehicle 901 in the normal state. In the normal state, passengers can sit in both the front seat 902 and the rear seat 903. The rear seat 903 is supported pivotably on a horizontal shaft 935 provided in a front end of the rear seat 903. FIG. 28 shows the rear seat 903 at a use position P1 and the cargo bed CN in the normal state. The "rear seat 903 at the use position P1" indicates the seat 903 placed on the rear stationary bottom plate 907.

FIG. 19 is a side view showing the pick-up style utility vehicle 901 in the expanded state. In the expanded state, the rear seat 903 is at a shunting position P2. The rear seat 903 at the shunting position P2 stands up on the front side of the stationary bottom plate 907. Therefore, the passengers cannot sit in the rear seat 903 at the shunting position P2. Meanwhile, since the rear seat 903 is shunted to the front side of the stationary bottom plate 907, the entire face of the stationary bottom plate 907 is cleared. Therefore, a cargo bed CE in the expanded state is extended more than the cargo bed CN in the normal state.

The normal state is changed to the expanded state as follows. Firstly, the rear seat 903 pivotable on the horizontal shaft 935 is folded down forward from the use position P1 to the shunting position P2. Then, in accordance with the positional change of the rear seat 903, a position of the screen 905 is changed to the front side. As a result, a front part of the stationary bottom plate 907 is also cleared. Therefore, the entire face of the stationary bottom plate 907 is usable as a bottom face of the cargo bed. Expansion side plates 943 accommodated in the plate portion 904 are developed to the front side. In such a way, the cargo bed CE in the expanded state is formed.

The rear seat 903 at the shunting position P2 is placed on the front side of the cargo bed CE in the expanded state. Therefore, space where the cargo bed is expandable is limited by the rear seat 903 at the shunting position P2. Thus, more expansion space is required.

SUMMARY OF THE INVENTION

The present invention is achieved in consideration with the problem above, and an object of the present invention is to provide a pick-up style utility vehicle with a more-expandable cargo bed.

The present invention is a pick-up style utility vehicle with an expandable cargo bed including a front seat, a rear seat, a stationary bottom plate serving as a bottom face of the cargo bed, and a seat holding mechanism for holding the rear seat at a use position where the rear seat is positioned on the front side of the stationary bottom plate or on the upper side of the stationary bottom plate and a shunting position where the rear seat is shunted to the front lower side or the lower side of the stationary bottom plate.

Preferably, the rear seat is shunted into a rear leg room provided on the front lower side of the stationary bottom plate at the shunting position.

According to the present invention, the rear seat can be shunted to the front lower side or the lower side of the stationary bottom plate. Therefore, space where the cargo bed is expandable forward is not limited by the rear seat 3 at the shunting position P2. Thus, the cargo bed is further expandable forward.

Configurations (1) to (10) may be preferably adapted for the pick-up style utility vehicle of the present invention.

In configuration (1), the pick-up style utility vehicle further includes an expansion bottom plate for expanding the bottom face of the cargo bed, and an expansion bottom plate holding mechanism for holding the expansion bottom plate at a storage position where the expansion bottom plate is placed out of the upper side of the leg room and an expansion position where the expansion bottom plate is positioned on the upper side of the leg room.

According to the configuration (1), the bottom face of the expanded cargo bed can be surely supported.

In configuration (2), the seat holding mechanism and the expansion bottom plate holding mechanism are formed by an identical shared linkage mechanism, and the shared linkage mechanism connects the rear seat and the expansion bottom plate so that the expansion bottom plate is at the expansion position when the rear seat is at the shunting position.

In configuration (3), the expansion bottom plate is fixed to the rear seat, and the seat holding mechanism and the expansion bottom plate holding mechanism are formed by an identical mechanism provided with a first rotary support mechanism for supporting the rear seat pivotably on a horizontal shaft in the right and left direction, and a first guide mechanism for supporting the rear seat shunted to the front side of the stationary bottom plate slidably in the vertical direction.

In configuration (4), the expansion bottom plate holding mechanism is formed by a second guide mechanism for supporting the expansion bottom plate slidably in the back and forth direction.

In configuration (5), the expansion bottom plate holding mechanism is formed by a second rotary support mechanism for supporting the expansion bottom plate pivotably on a horizontal shaft in the right and left direction relative to the stationary bottom plate.

In configuration (6), the pick-up style utility vehicle further includes a screen for partitioning the rear seat and the cargo bed. The screen is formed by the expansion bottom plate on the lower side and an upper screen on the upper side, the expansion bottom plate holding mechanism is formed by a third rotary support mechanism for supporting the expansion bottom plate pivotably on a horizontal shaft in the right and left direction relative to the stationary bottom plate, and the upper screen is supported pivotably on a horizontal shaft in the right and left direction relative to the expansion bottom plate.

In configuration (7), the pick-up style utility vehicle further includes a screen for partitioning the rear seat and the cargo bed. The screen is stretchable and supported pivotably on a horizontal shaft in the right and left direction on the rear seat.

In configuration (8), the rear seat includes a plurality of seat divisions divided in the right and left direction, and the seat holding mechanism serves as an engagement part for engaging the seat divisions and the stationary bottom plate at the use position and the shunting position, respectively.

In configuration (9), the seat holding mechanism is formed by a fourth rotary support mechanism for supporting the rear seat pivotably on a horizontal shaft in the right and left direction and a third guide mechanism for supporting the rotary support mechanism movably in the back and forth direction.

In configuration (10), the seat holding mechanism is formed by a second linkage mechanism.

DETAILED DESCRIPTION OF THE PREFERRED EMBODIMENTS (First Embodiment)

Figure 2:
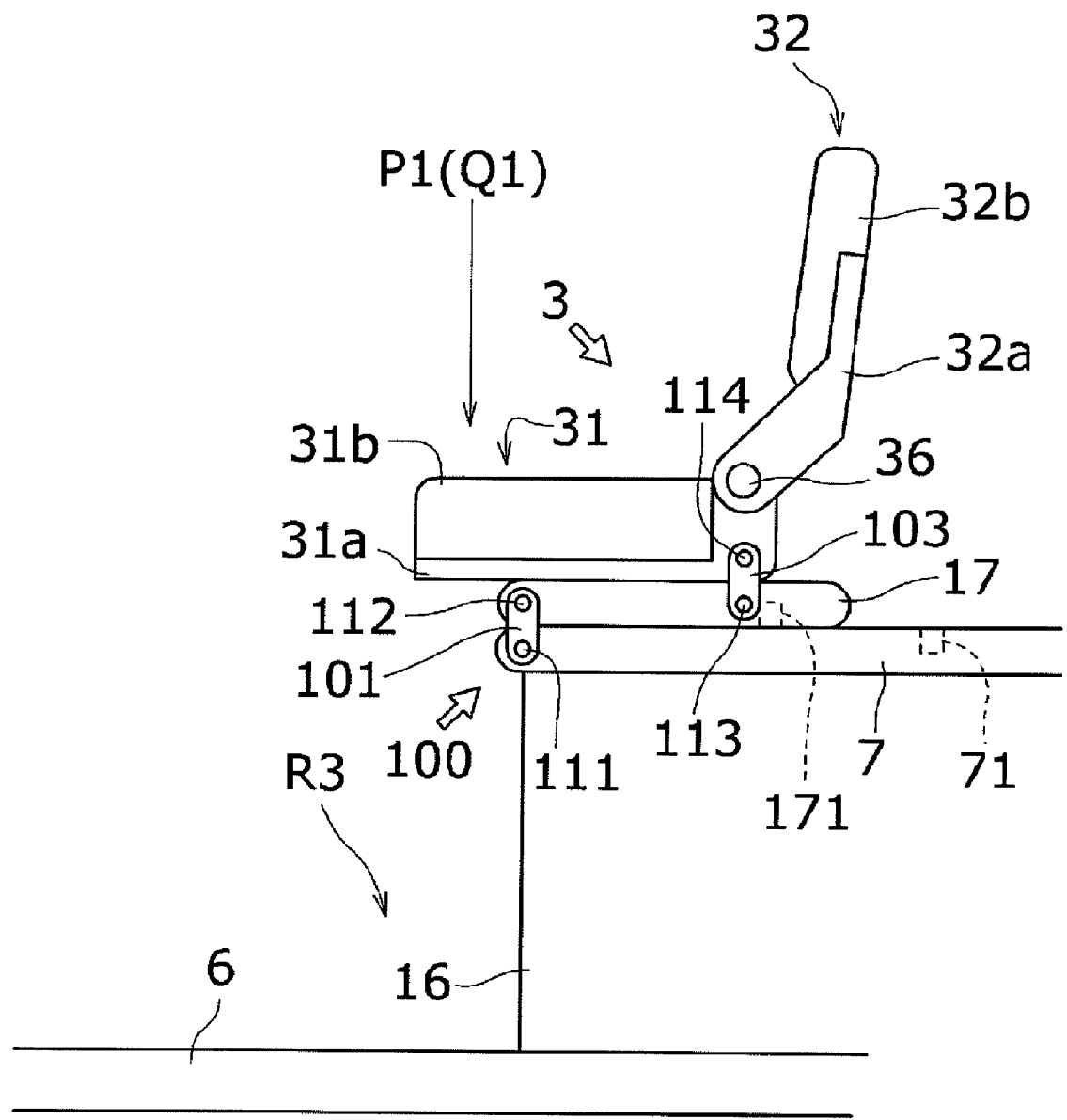
FIG. 2 is a side view showing posture of a shared linkage mechanism in the normal state (the first embodiment)
Figure 3:
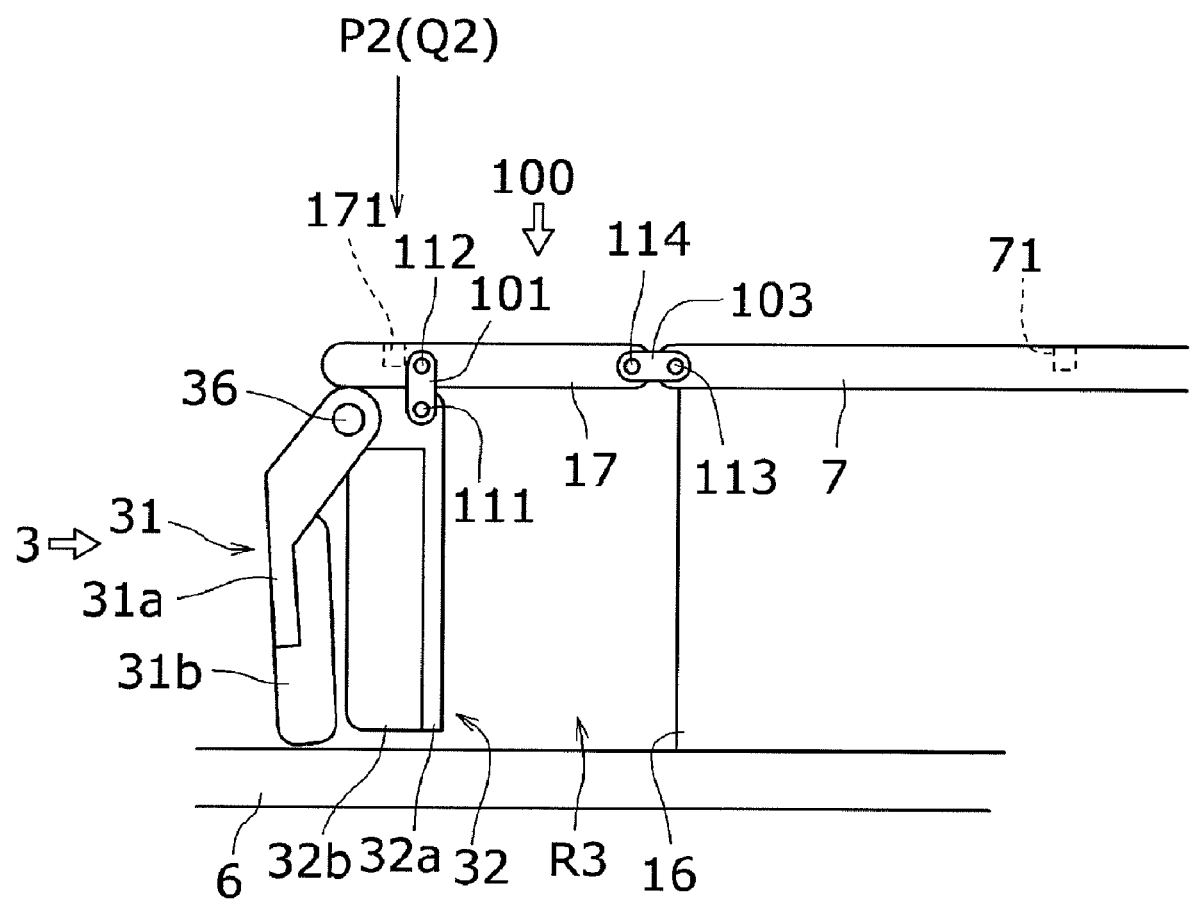
FIG. 3 is a side view showing posture of the shared linkage mechanism in an expanded state (the first embodiment)
Figure 4:
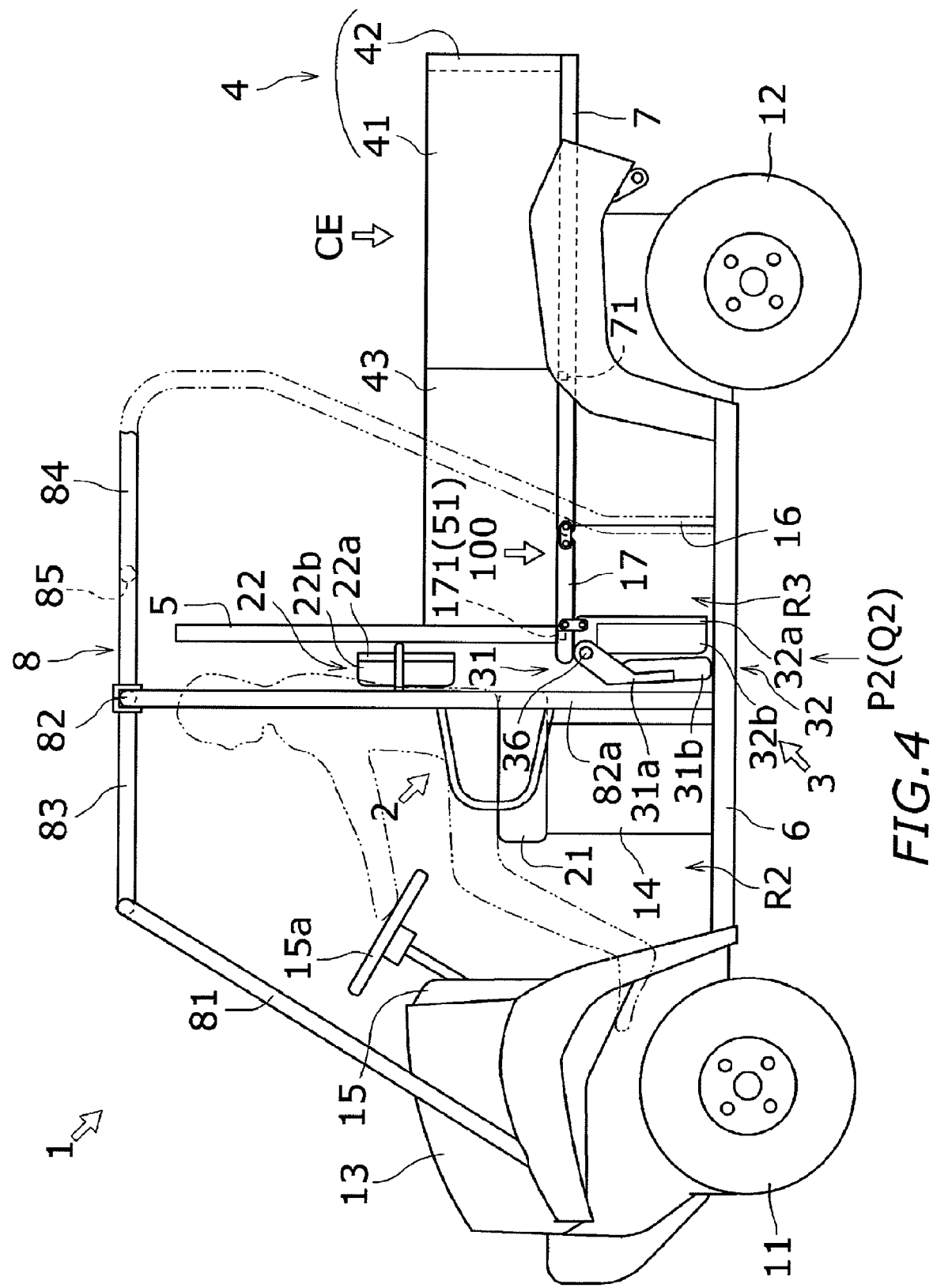
FIG. 4 is a side view showing the pick-up style utility vehicle in the expanded state (the first embodiment)

A pick-up style utility vehicle 1 is switchable between a normal state in which the vehicle is used as a four-seater vehicle (FIGS. 1 and 2) and an expanded state in which the vehicle is used as a two-seater vehicle with an expanded cargo bed (FIGS. 3 and 4). Hereinafter, a configuration of this pick-up style utility vehicle will be described in detail based on the drawings.

Figure 1:
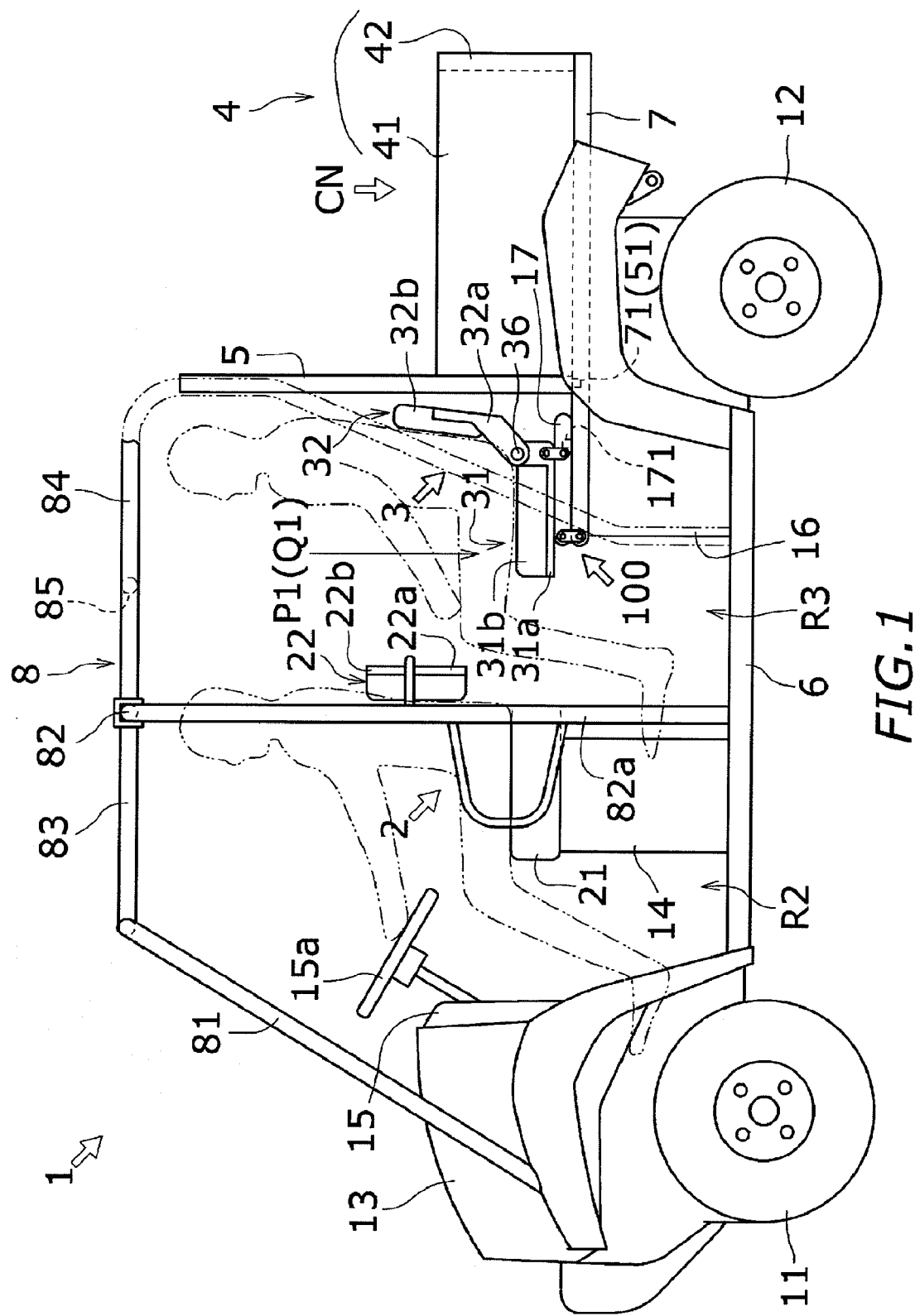
FIG. 1 is a side view showing a pick-up style utility vehicle in a normal state (a first embodiment)

FIG. 1 is a side view showing the pick-up style utility vehicle 1 in the normal state. The pick-up style utility vehicle 1 includes a chassis 6 provided with a pair of right and left front wheels 11 and a pair of right and left rear wheels 12. A hood 13, a front support stand 14, and a rear support stand 16 are arranged on the chassis 6 in this order from the front to the rear of the vehicle. A dashboard (an operation portion) 15 provided with a steering wheel 15a and the like is arranged in a rear part of the hood 13. A front seat 2 is arranged on the front support stand 14. A stationary bottom plate 7 is arranged on the rear support stand 16. A rear seat 3, a screen 5 and a plate portion 4 are arranged on the stationary bottom plate 7 in this order from the front side to the rear side. A cabin frame 8 is arranged so as to surround the dashboard 15, the front seat 2, and the rear seat 3. The cabin frame 8 is fixed to the chassis 6. A cabin is formed in the interior surrounded by the chassis 6 and the cabin frame 8. It should be noted that description of positional relationships (such as a front end and the upper side) in a first embodiment is based on the posture in the normal state (FIGS. 1 and 2).

The cabin frame 8 includes a first U shape member 81, a second U shape member 82, two connection members 83, 83, two L shape members 84, 84, and a connection member 85. The two connection members 83, 83, the second U shape member 82, and the two L shape members 84, 84 are arranged in this order after the first U shape member 81. The first U shape member 81 and the second U shape member 82 are formed in an upside down U shape opening downward in a front view. On the right and left sides, the two connection members 83, 83 connect the first U shape member 81 on the front side and the second U shape member 82 on the rear side. The two L shape members 84, 84 are formed in a symmetrically opposite L shape in a side view. The two L shape members 84, 84 are arranged so as to extend rearward from the second U shape member 82. The connection member 85 connects the two L shape members 84, 84 to each other.

The front seat 2 and the rear seat 3 are seats formed in a bench shape elongated in the right and left direction. In the present embodiment, two passengers can sit side by side in both the front seat 2 and the rear seat 3. A front leg room R2 for the passengers in the front seat 2 is provided between the hood 13 and the front support stand 14. A rear leg room R3 for the passengers seated on the rear seat 3 is provided between the front support stand 14 and the rear support stand 16. The rear leg room R3 is positioned forward and below the level of the lower side of the stationary bottom plate 7.

In FIG. 1, the front seat 2 is provided with a main seat 21 and a front backrest 22. The front backrest 22 is provided with a front backrest back plate 22a, and a front backrest cushion 22b fixed to the front backrest back plate 22a. The main seat 21 is fixed to the front support stand 14. The front backrest back plate 22a is fixed to the second U shape member 82 so as to bridge both legs 82a, 82a of the second U shape member 82.

In FIG. 1, the rear seat 3 is provided with a main seat 31, a backrest 32, and a horizontal shaft 36. The main seat 31 is provided with a seat back plate 31a, and a seat cushion 31b fixed to the seat back plate 31a. The backrest 32 is provided with a backrest back plate 32a, and a backrest cushion 32b fixed to the backrest back plate 32a. A lower end of the backrest back plate 32a is supported on the seat back plate 31a pivotably on the horizontal shaft 36. The horizontal shaft 36 is a shaft in the right and left direction.

When the backrest 32 is pivoted relative to the main seat 31, the seat cushion 31b and the backrest cushion 32b face each other. Hereinafter, a state in which the seat cushion 31b and the backrest cushion 32b face each other is called as a facing state.

In FIG. 1, a cargo bed CN in the normal state is formed. The cargo bed CN in the normal state includes the stationary bottom plate 7, and the plate portion 4 arranged on the stationary bottom plate 7. The plate portion 4 includes two stationary side plates 41, 41 arranged in right and left ends in a rear part of the stationary bottom plate 7, and a rear plate 42 arranged in a rear end of the stationary bottom plate 7. Here, the rear part of the stationary bottom plate 7 serves as a bottom face of the cargo bed CN. Expansion side plates 43 are supported on the inside of the stationary side plates 41 slidably in the back and forth direction. In the normal state, the expansion side plates 43 are stored on the front side of the stationary side plates 41.

The screen 5 is detachably supported on the chassis 6. The screen 5 can be fixed to the chassis 6 at two different points in the back and forth direction so as to correspond to the normal state and the expanded state, respectively. Specifically, a shaft portion 51 projecting downward is provided in a lower end of the screen 5. An engagement hole 71 to be engaged with the shaft portion 51 is provided in the stationary bottom plate 7, and an engagement hole 171 to be engaged with the shaft portion 51 is provided in an expansion bottom plate 17 described later.

In the first embodiment, the pick-up style utility vehicle 1 is provided with the expansion bottom plate 17 and a shared linkage mechanism 100 in order to realize an expandable cargo bed. The expansion bottom plate 17 expands the bottom face of the cargo bed CN. The shared linkage mechanism 100 can movably hold the rear seat 3 and the expansion bottom plate 17.

FIG. 2 is a side view showing posture of the shared linkage mechanism 100 in the normal state. In FIG. 2, the rear seat 3 is positioned on the upper side of the stationary bottom plate 7. A position of the rear seat 3 at this time is a use position P1. When the rear seat 3 is at the use position P1, the passengers can sit on the rear seat 3. The expansion bottom plate 17 is positioned on the upper side of the stationary bottom plate 7. A position of the expansion bottom plate 17 at this time is a storage position Q1. In FIG. 2, the rear seat 3 at the use position P1 is supported on the stationary bottom plate 7 via the expansion bottom plate 17.

In FIG. 2, the shared linkage mechanism 100 is provided with a first link 101, the expansion bottom plate (a second link) 17, a third link 103, a first shaft 111, a second shaft 112, a third shaft 113, and a fourth shaft 114. The shafts 111, 112, 113, and 114 are horizontal shafts in the right and left direction. The constituent elements of the shared linkage mechanism 100 are connected as follows. The first shaft 111 is provided in a front end of the stationary bottom plate 7 in the right and left direction. The second shaft 112 is provided in the front end of the stationary bottom plate 7 in the right and left direction. The first shaft 111 and the second shaft 112 are respectively provided in both ends of the first link 101. The third shaft 113 is provided in the rear part of the stationary bottom plate 7 in the right and left direction. The fourth shaft 114 is provided in a rear end of the seat back plate 31a. The third shaft 113 and the fourth shaft 114 are respectively provided in both ends of the third link 103.

When the rear seat 3 is at the use position P1, the expansion bottom plate 17 is at the storage position Q1. Specifically, the expansion bottom plate 17 is disposed on the stationary bottom plate 7, and the rear seat 3 is disposed on the expansion bottom plate 17. Therefore, the expansion bottom plate 17 is stored between the stationary bottom plate 7 and the rear seat 3.

FIG. 3 is a side view showing the posture of the shared linkage mechanism 100 in the expanded state. In FIG. 3, the rear seat 3 is shunted into the rear leg room R3. A position of the rear seat 3 at this time is a shunting position P2. The expansion bottom plate 17 is positioned above the rear leg room R3. A position of the expansion bottom plate 17 at this time is an expansion position Q2.

At this time, the expansion bottom plate 17 and the stationary bottom plate 7 are placed side by side in the horizontal direction, and the expansion bottom plate 17 projects from a front end of the stationary bottom plate 7. As shown in FIG. 3, the rear seat 3 hangs down from the lower side of the expansion bottom plate 17. The main seat 31 and the backrest 32 of the rear seat 3 face each other in the in the expanded state. At this time, the entire rear seat 3 is stored in the rear leg room R3.

FIG. 4 is a side view showing the pick-up style utility vehicle 1 in the expanded state. In FIG. 4, a cargo bed CE in the expanded state is formed. The cargo bed CE in the expanded state includes the stationary bottom plate 7, the expansion bottom plate 17, the two stationary side plates 41, 41, the two expansion side plates 43, 43, and the rear plate 42. In the expanded state, the expansion side plates 43 project from the front ends of the stationary side plates 41. The screen 5 is arranged at the front ends of the expansion side plates 43.

In the first embodiment, the shared linkage mechanism 100 serves as a seat holding mechanism and an expansion bottom plate holding mechanism. The shared linkage mechanism 100 serving as the seat holding mechanism can hold the rear seat 3 movably between the use position P1 (FIGS. 1 and 2) and the shunting position P2 (FIGS. 3 and 4). The shared linkage mechanism 100 serving as the expansion bottom plate holding mechanism can hold the expansion bottom plate 17 movably between the storage position Q1 in which the expansion bottom plate 17 is positioned on the upper side of the stationary bottom plate 7 and the expansion position Q2 in which the expansion bottom plate 17 is positioned on the upper side of the rear leg room R3.

Since the pick-up style utility vehicle 1 in the first embodiment is provided with the seat holding mechanism (the shared linkage mechanism 100), the rear seat 3 can be shunted into the rear leg room R3 below the level of the lower side of the stationary bottom plate 7. Therefore, the space, into which the cargo bed is expandable forward, is not limited by the rear seat 3 when in the shunting position P2.

Since the pick-up style utility vehicle 1 in the first embodiment is further provided with the expansion bottom plate holding mechanism (the shared linkage mechanism 100), the bottom face of the expanded cargo bed can be surely supported.

(Second Embodiment)

Figure 5:
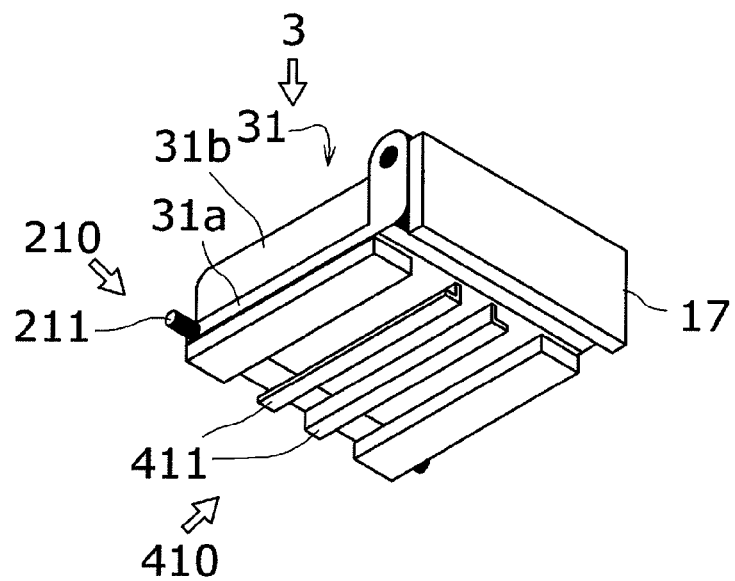
FIG. 5 is a perspective view of a rear seat and an expansion bottom plate seen from the rear side (a second embodiment)
Figure 6:
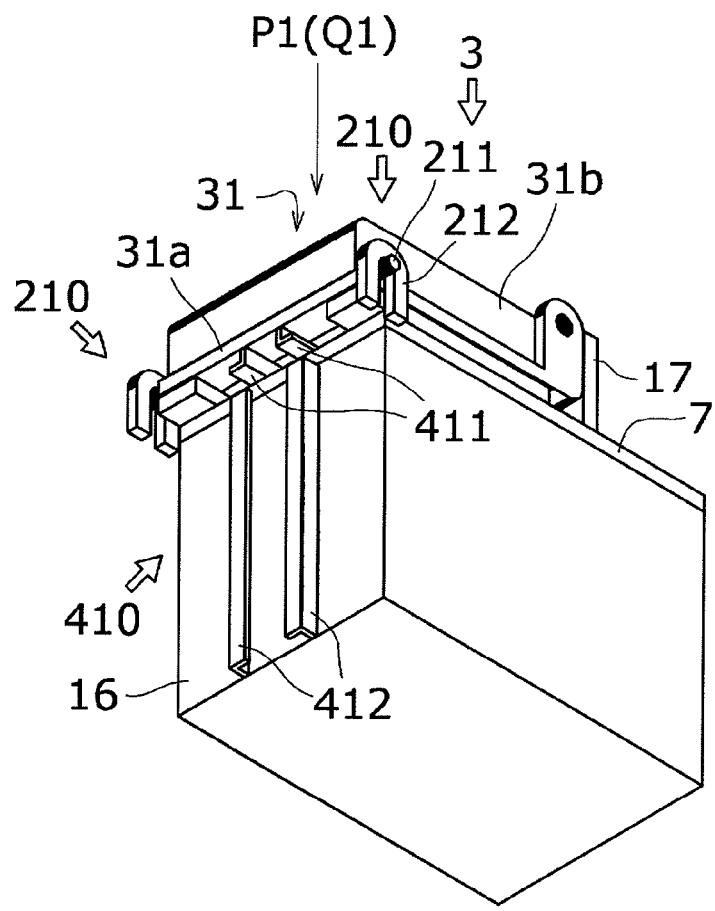
FIG. 6 is a perspective view of the rear seat and the expansion bottom plate seen from the front lower side (the second embodiment)
Figure 7:
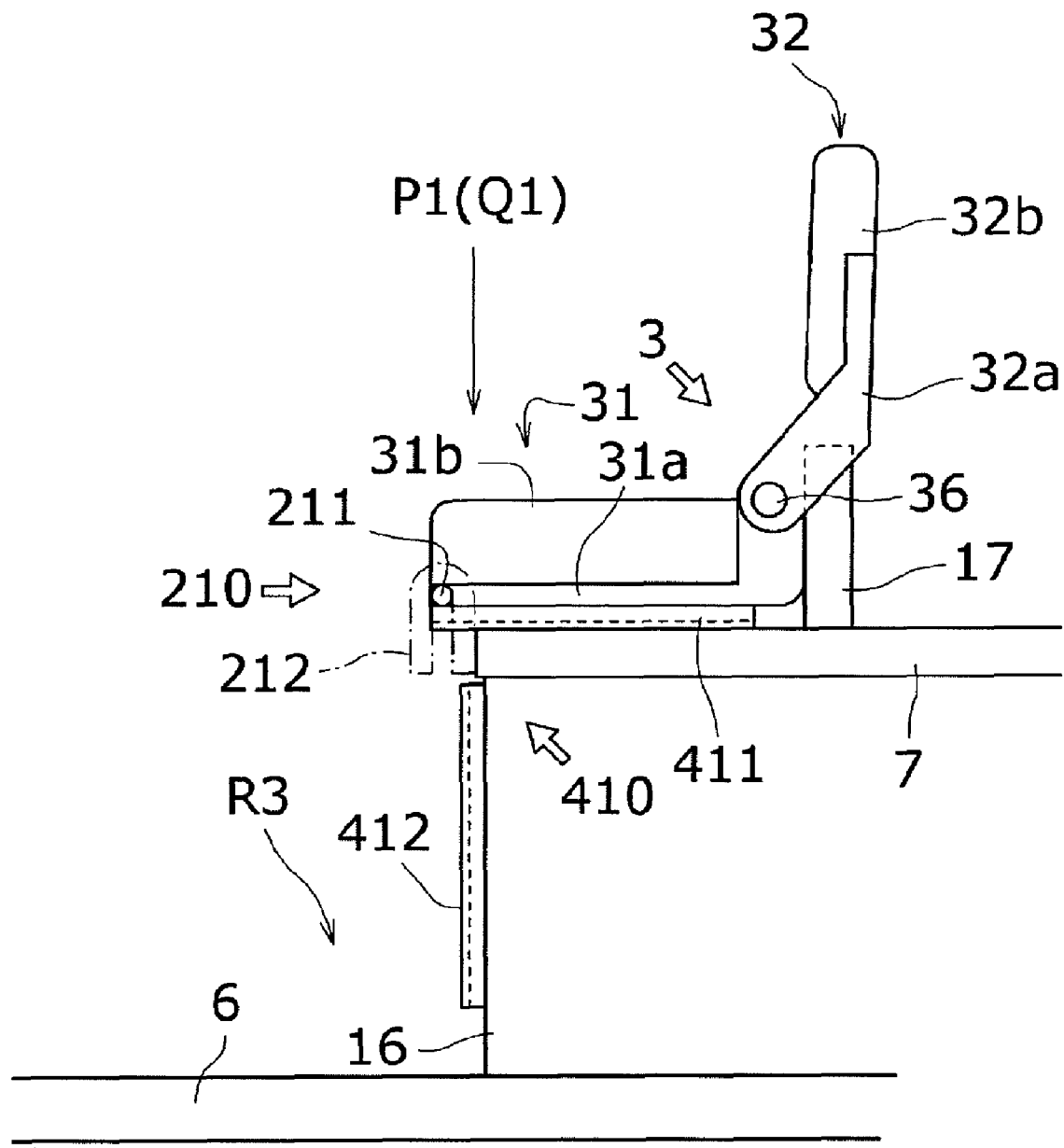
FIG. 7 is a side view showing the pick-up style utility vehicle in a first stage (the normal state) (the second embodiment)

FIGS. 5 to 9 show a structure of a cargo bed expansion part of the pick-up style utility vehicle 1 in a second embodiment. The second embodiment is the same as the first embodiment except configurations of the seat holding mechanism and the expansion bottom plate holding mechanism. In the second embodiment, parts which are common to the first embodiment will be given the same reference numerals. Description of positional relationships in the second embodiment is based on posture in the normal state (FIG. 7).

FIG. 5 is a perspective view of the rear seat 3 and the expansion bottom plate 17 seen from the rear side. The expansion bottom plate 17 is fixed to a rear face of the seat back plate 31a of the rear seat 3. The backrest 32 is omitted in FIG. 5.

In the second embodiment, the seat holding mechanism and the expansion bottom plate holding mechanism are formed by an identical mechanism provided with a first rotary support mechanism 210 and a first guide mechanism 410.

FIG. 6 is a perspective view of the rear seat 3 and the expansion bottom plate 17 seen from the front lower side. In FIG. 6, the first rotary support mechanism 210 is provided with two horizontal shafts 211, 211, and two rotary guides 212, 212. The two horizontal shafts 211, 211 are respectively provided in a front end of the rear back plate 31a on the right and left sides. The two rotary guides 212, 212 are respectively provided in the rear seat 3 on the right and left sides. The rotary guides 212 are formed in an upside down U shape opening downward. The horizontal shafts 211 are rotatably supported in the rotary guides 212. It should be noted that the backrest 32 is omitted in FIG. 6.

In FIG. 6, the first guide mechanism 410 is provided with two seat rails 411, 411, and two support rails 412, 412. The two seat rails 411, 411 are arranged side by side in the right and left direction, and fixed to a lower face of the seat back plate 31a. The seat rails 411 extend in the back and forth direction. The two support rails 412, 412 are also placed side by side in the right and left direction, and fixed to a front face of the rear support stand 16. The support rails 412 extend in the vertical direction. Both the seat rails 411 and the support rails 412 have an L shape section so as to be engaged with each other. When the seat rails 411 and the support rails 412 are engaged with each other, the rear seat 3 is supported on the stationary bottom plate 7 slidably in the vertical direction.

Figure 8:
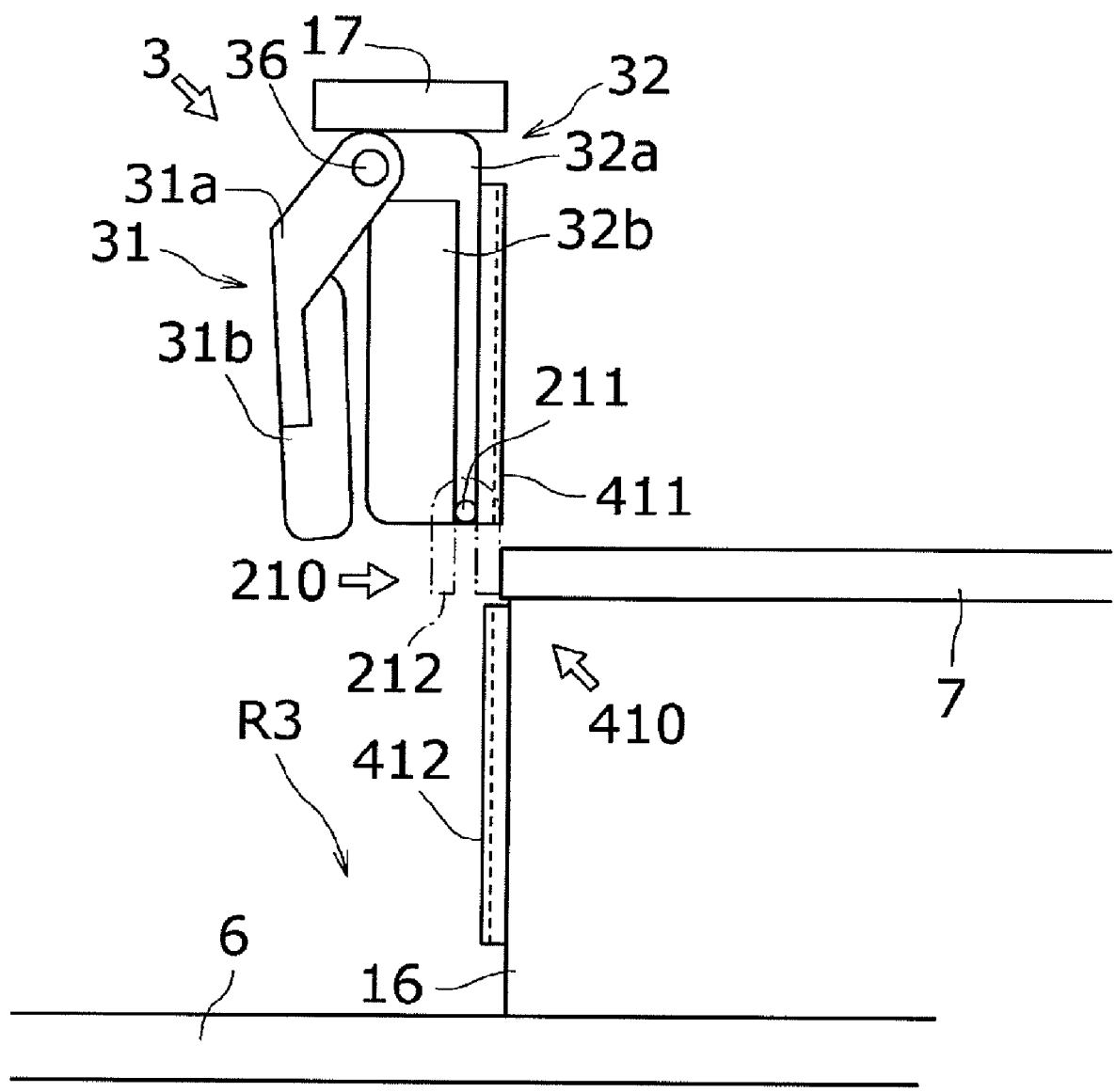
FIG. 8 is a side view showing the pick-up style utility vehicle in a second stage (the second embodiment)
Figure 9:
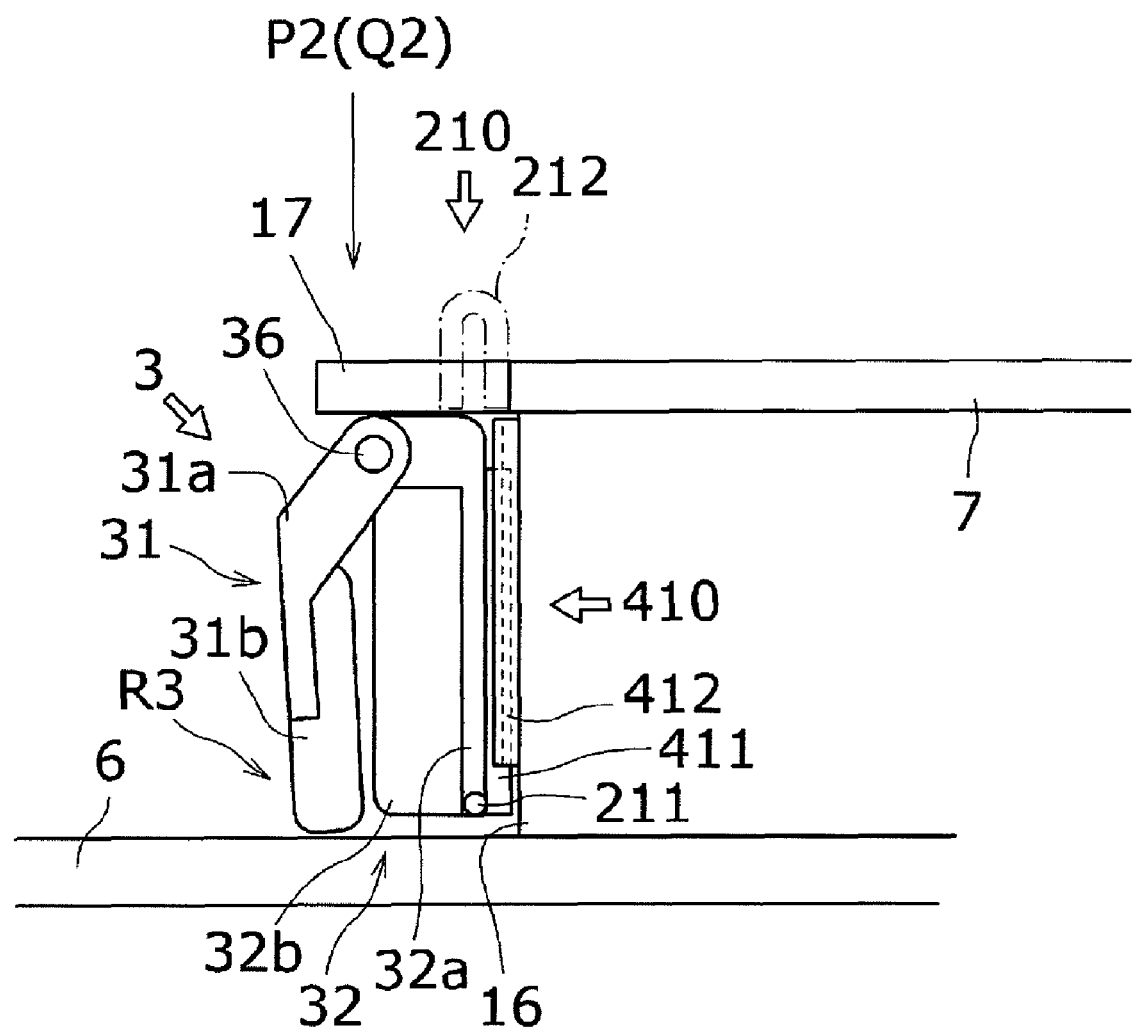
FIG. 9 is a side view showing the pick-up style utility vehicle in a third stage (the expanded state) (the second embodiment)

FIGS. 7 to 9 show three stages from the normal state to the expanded state. FIGS. 7, 8 and 9 show a first stage (the normal state), a second stage, and a third stage (the expanded state), respectively.

In the first stage (the normal state) of FIG. 7, the rear seat 3 is at the use position P1, and the expansion bottom plate 17 is at the storage position Q1. The rear seat 3 at the use position P1 is disposed on the stationary bottom plate 7. The expansion bottom plate 17 at the storage position Q1 is placed along a vertical plane. When the rear seat 3 is at the use position P1, the seat rails 411 and the support rails 412 cannot be engaged with each other. Here, the passengers pivot the backrest 32 before moving the rear seat 3 to the shunting position P2, so that the backrest 32 faces the main seat 31.

In the second stage of FIG. 8, the rear seat 3 is pivoted forward by 90 degrees, so that the rear seat 3 is shunted to the front side of the stationary bottom plate 7. At this time, the expansion bottom plate 17 is placed along a horizontal plane. When the seat rails 411 are parallel to the support rails 412 with the rear seat 3 at posture after pivoting, the seat rails 411 can be engaged with the support rails 412.

In the third stage (the expanded state) of FIG. 9, the rear seat 3 is moved to the lower side of the position in the second stage, so that the rear seat 3 is at the shunting position P2. A position of the expansion bottom plate 17 at this time is the expansion position Q2. When the expansion bottom plate 17 is at the expansion position Q2, upper faces of the stationary bottom plate 7 and the expansion bottom plate 17 form an identical horizontal plane. Therefore, the stationary bottom plate 7 and the expansion bottom plate 17 can be utilized as a bottom face of the cargo bed CE in the expanded state.

(Third Embodiment)

Figure 10:
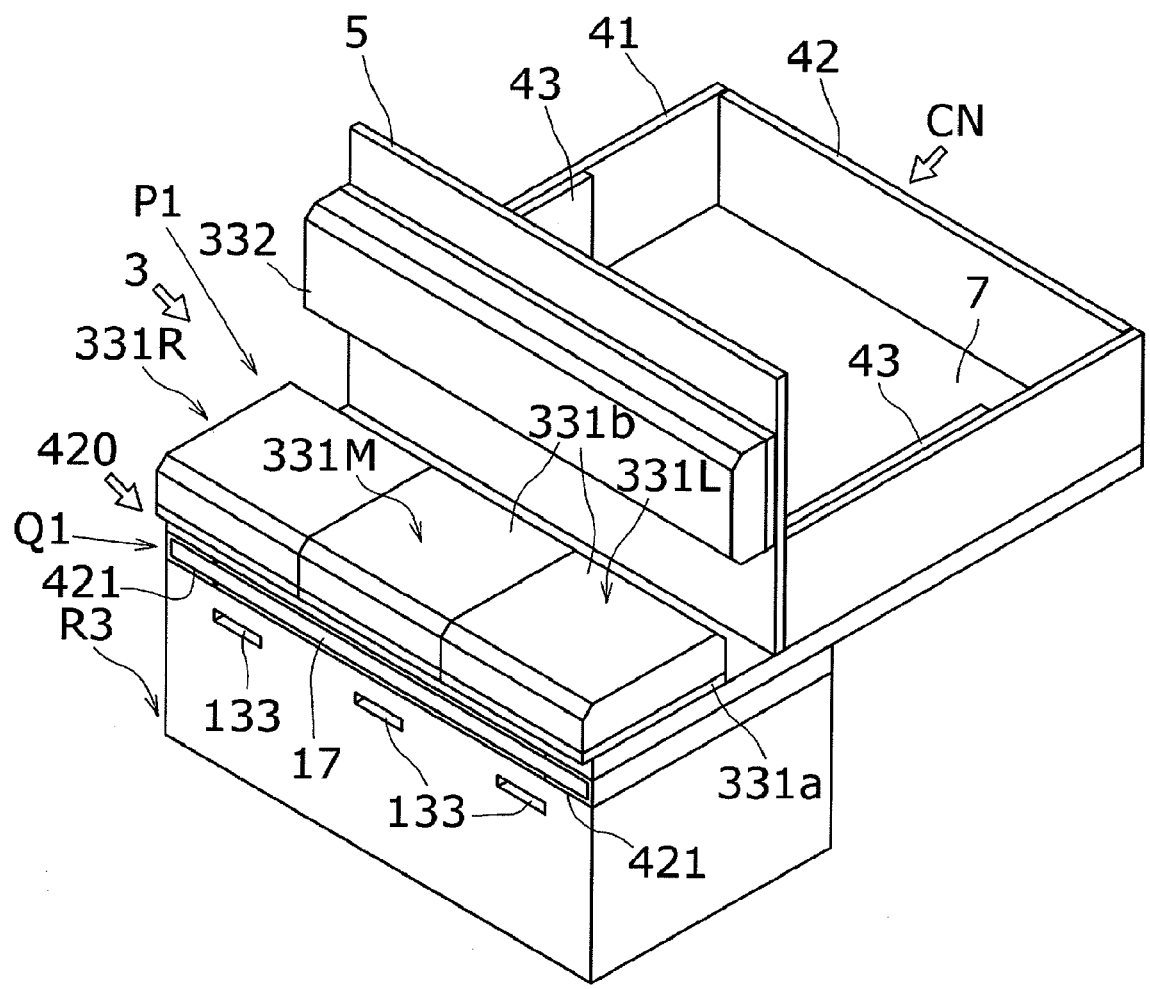
FIG. 10 is a perspective view of the rear seat and the expansion bottom plate in the normal state seen from the front side (a third embodiment)
Figure 11:
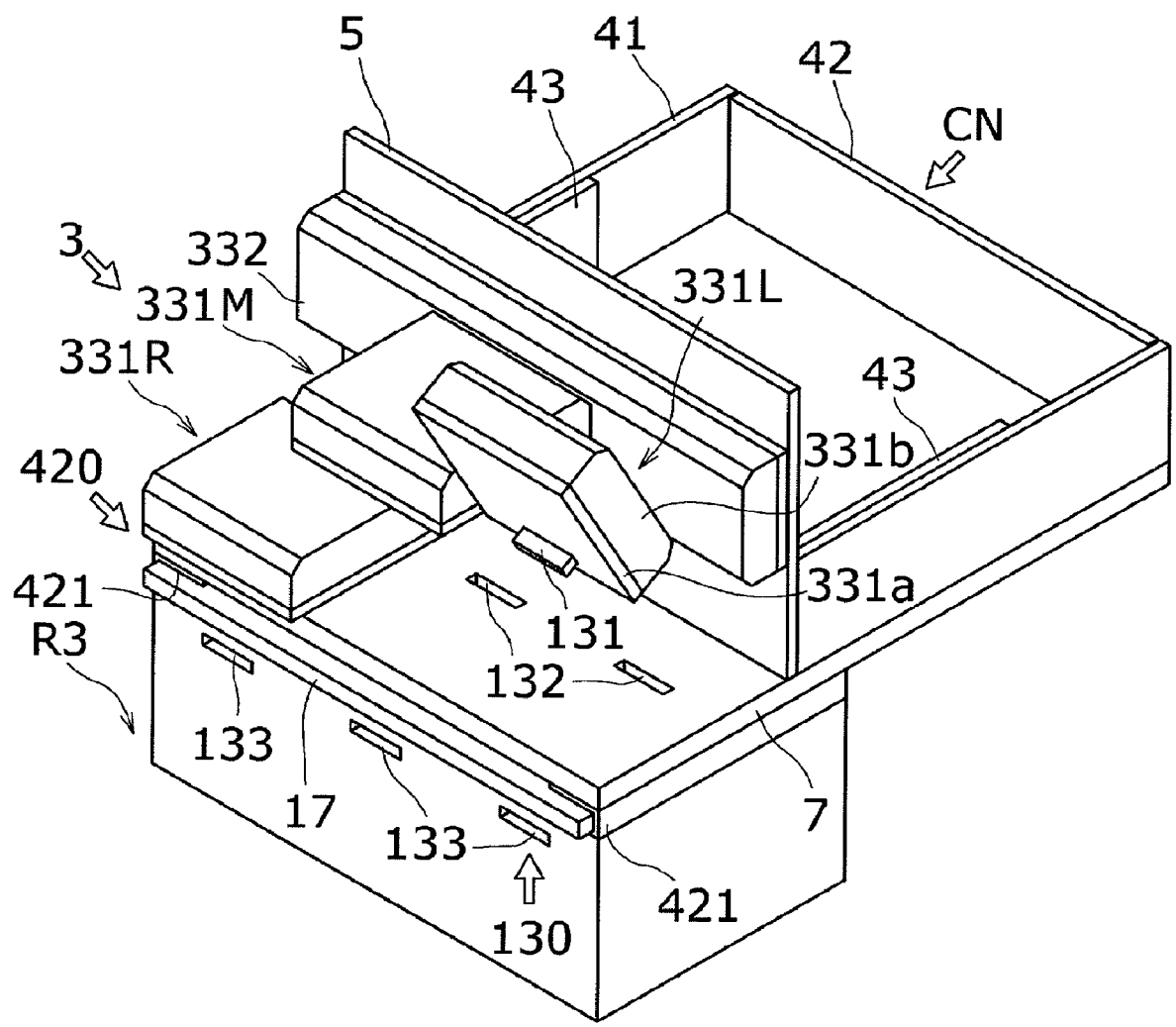
FIG. 11 is a perspective view of the rear seat and the expansion bottom plate during a transition process from the normal state to the expanded state seen from the front side (the third embodiment)
Figure 12:
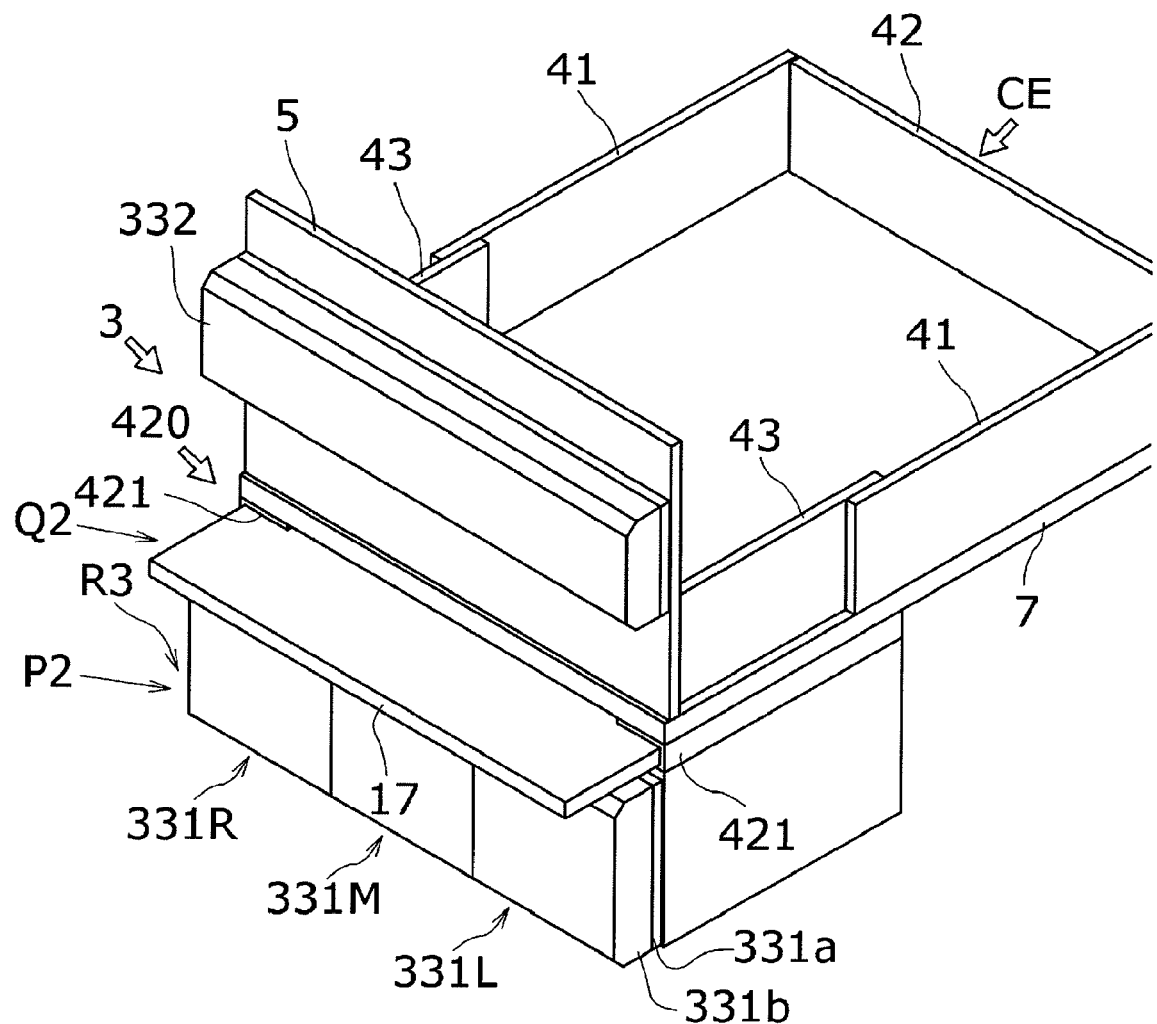
FIG. 12 is a perspective view of the rear seat and the expansion bottom plate in the expanded state seen from the front side (the third embodiment)

FIGS. 10 to 12 show the pick-up style utility vehicle 1 in a third embodiment. The third embodiment is the same as the first embodiment except configurations of the rear seat 3, the seat holding mechanism, and the expansion bottom plate holding mechanism. In the third embodiment, parts which are common to the first embodiment will be given the same reference numerals. Description of positional relationships in the third embodiment is based on the posture in the normal state (FIG. 10).

FIG. 10 is a perspective view of the rear seat 3 and the expansion bottom plate 17 in the normal state seen from the front side. In FIG. 10, the rear seat 3 is at the use position P1. The rear seat 3 in the third embodiment includes a main seat 331 and a backrest 332. The backrest 332 is supported by the screen 5. The main seat 331 includes a plurality of (three) seat divisions 331L, 331M, and 331R divided in the right and left direction. The seat division 331L is positioned on the left side, the seat division 331M is positioned on the center, and the seat division 331R is positioned on the right side. The seat divisions are respectively provided with seat back plates 331a and seat cushions 331b.

In the third embodiment, the expansion bottom plate holding mechanism is formed by a second guide mechanism 420.

In FIG. 10, the second guide mechanism 420 is provided with two U shape guides 421, 421 arranged on the right and left sides. The U shape guides 421, 421 are arranged on the lower side of the stationary bottom plate 7, and extend along the back and forth direction. Ends of the expansion bottom plate 17 in the right and left direction are stored inside the U shape guides 421. The expansion bottom plate 17 is supported by the second guide mechanism 420 slidably in the back and forth direction.

In the third embodiment, the seat holding mechanism is formed by engagement mechanisms 130.

FIG. 11 is a perspective view of the rear seat 3 and the expansion bottom plate 17 during a transition process from the normal state to the expanded state. In FIG. 11, the engagement mechanisms 130 are respectively provided with shaft portions 131, hole portions 132 for the use position P1, and hole portions 133 for the shunting position P2. The shaft portions 131 projecting downward are fixed to lower faces of the seat back plates 331a of the seat divisions 331R, 331M and 331L. The hole portions 132 for the use position are holes formed on an upper face of the stationary bottom plate 7 opening upward. The hole portions 133 for the shunting position are holes formed on a front face of the rear support stand 16. The shaft portions 131 can be engaged with both the hole portions 132 and the hole portions 133. The seat divisions 331R, 331M, and 331L are respectively provided with the engagement mechanisms 130. That is, the three shaft portions 131, the three hole portions 132, and the three hole portions 133 are provided in the pick-up style utility vehicle 1.

In FIG. 10, the rear seat 3 is at the use position P1, and the expansion bottom plate 17 is at the storage position Q1. At this time, the rear seat 3 is disposed on the stationary bottom plate 7. The three shaft portions 131 of the seat divisions 331R, 331M, and 331L are respectively engaged with the three hole portions 132 for the use position P1. The expansion plate 17 at the storage position Q1 is positioned on the rear side of the front end of the stationary bottom plate 7.

In the third embodiment, the passengers themselves carry the rear seat 3 between the use position P1 and the shunting position P2. That is, the passengers lift up one of the seat divisions 331R, 331M, and 331L at the use position P1, and then attach the seat division to the shunting position P2. The passengers move all the seat divisions 331R, 331M, and 331L.

FIG. 12 is a perspective view of the rear seat and the expansion bottom plate in the expanded state seen from the front side. In FIG. 12, the rear seat 3 is at the shunting position P2, and the expansion bottom plate 17 is at the expansion position Q2. The rear seat 3 at the shunting position P2 is pivoted forward by 90 degrees from the posture in the normal state. At this time, the three shaft portions 131 of the seat divisions 331R, 331M, and 331L are engaged with the three hole portions 133 for the shunting position P2. The expansion bottom plate 17 at the expansion position Q2 projects to the front side of the front end of the stationary bottom plate 7, and is positioned on the upper side of the rear leg room R3.

(Fourth Embodiment)

Figure 13:
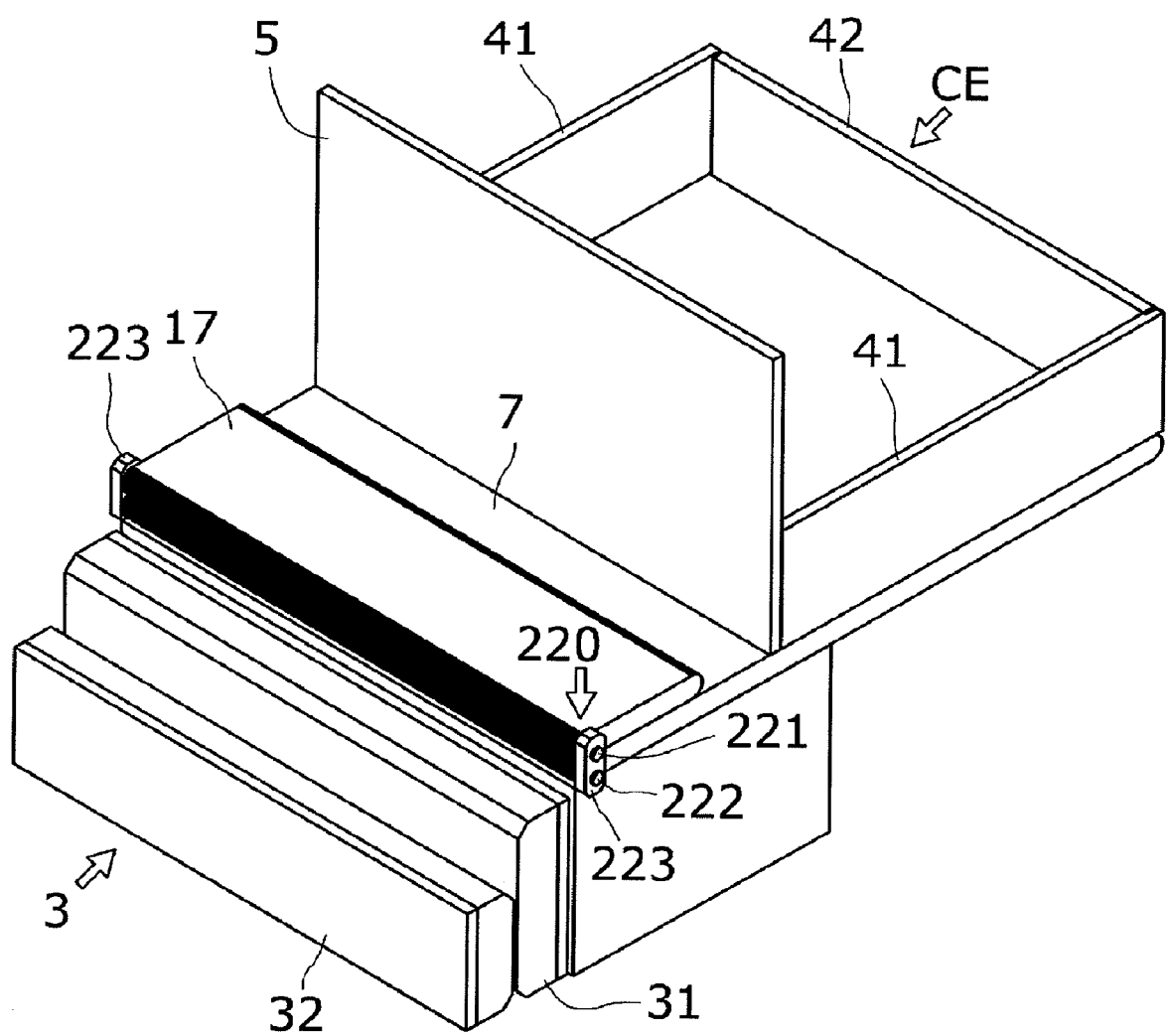
FIG. 13 is a perspective view of the expansion bottom plate in the normal state and at a storage position seen from the front side (a fourth embodiment)
Figure 14:
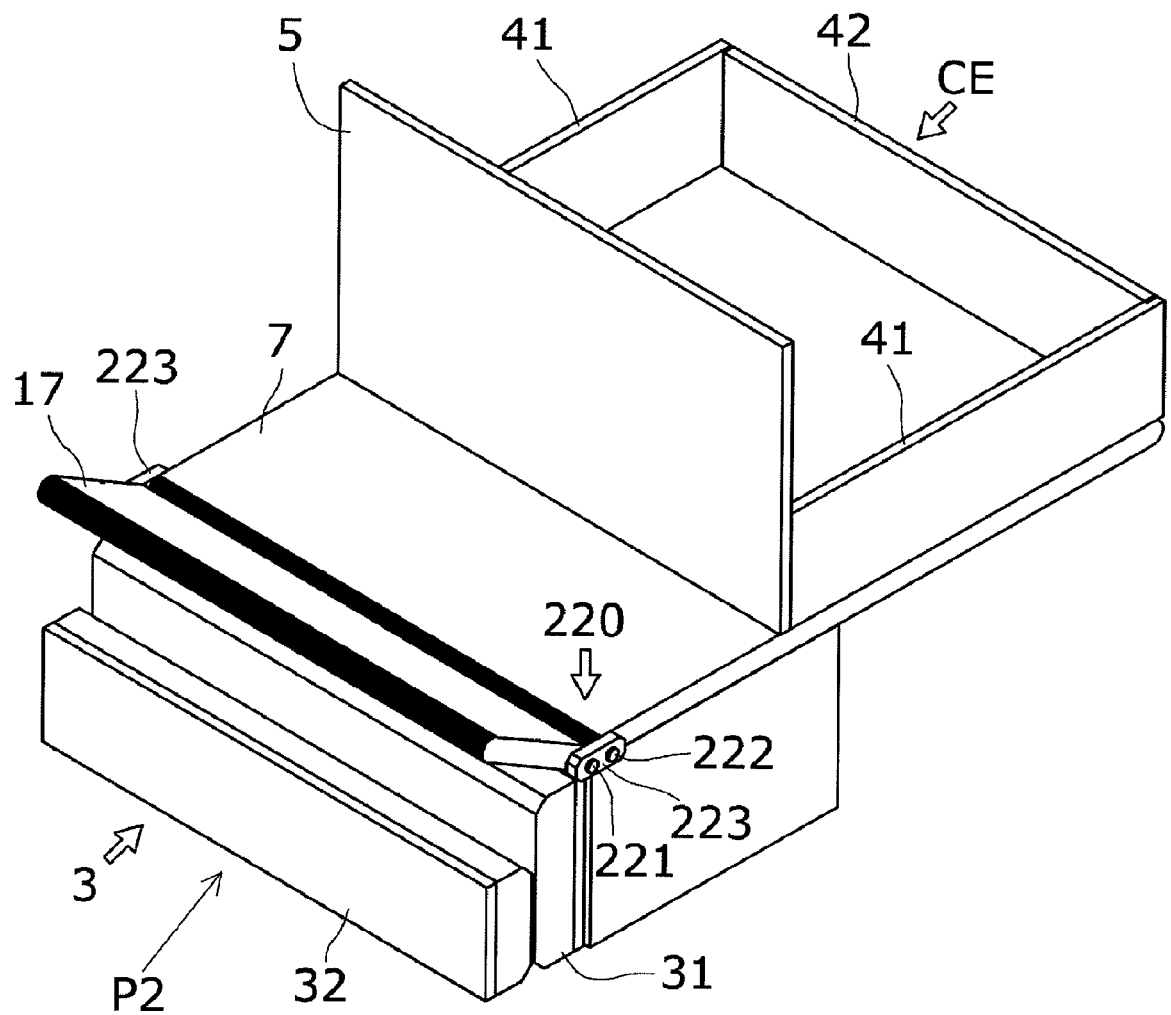
FIG. 14 is a perspective view of the expansion bottom plate seen from the front side (the fourth embodiment)
Figure 15:
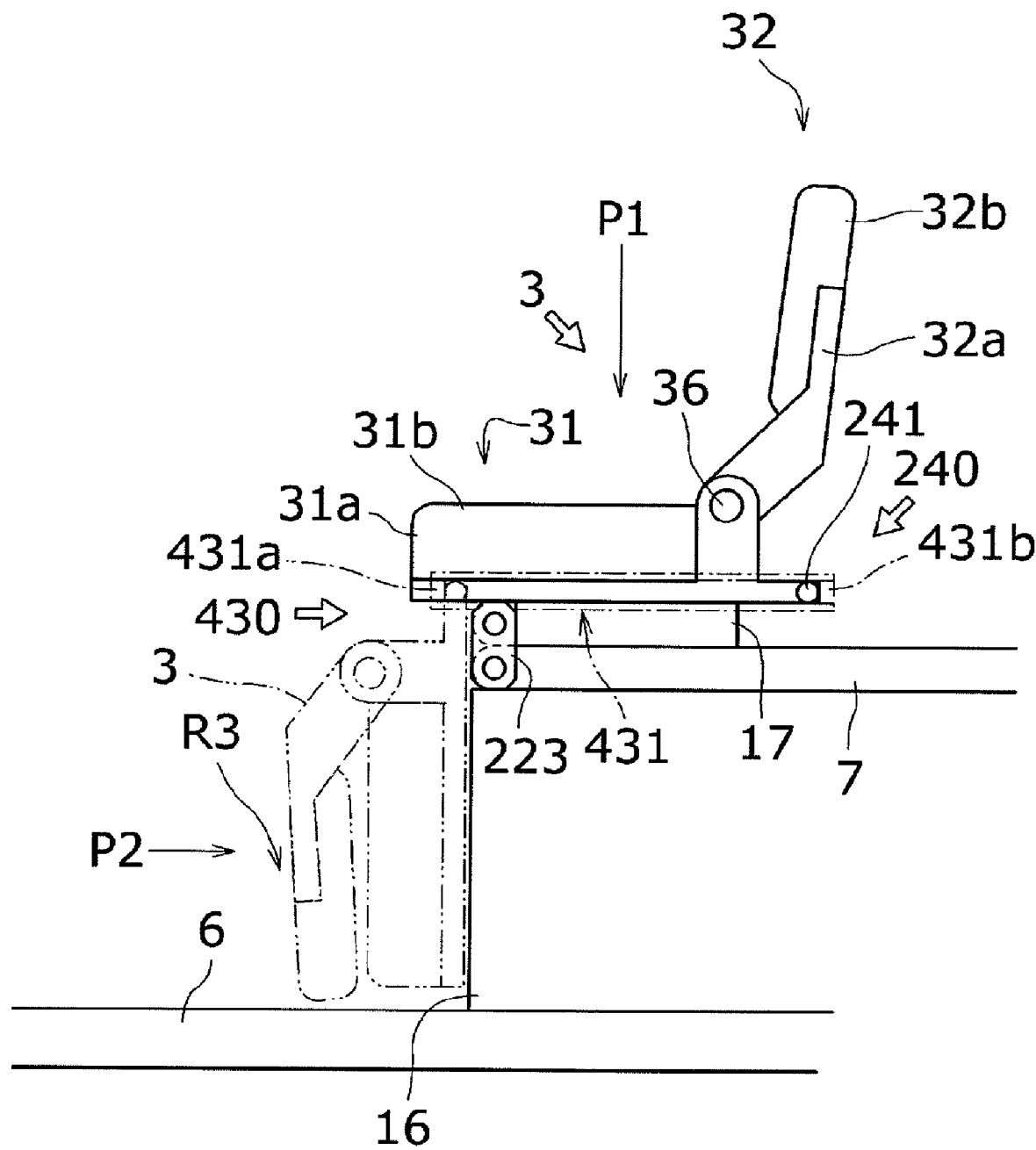
FIG. 15 is a side view showing the rear seat in the normal state and at a use position (the fourth embodiment)

FIGS. 13 to 16 show the pick-up style utility vehicle 1 in a fourth embodiment. The fourth embodiment is the same as the first embodiment except configurations of the seat holding mechanism and the expansion bottom plate holding mechanism. In the fourth embodiment, parts which are common to the first embodiment will be given the same reference numerals. Description of positional relationships in the fourth embodiment is based on the posture in the normal state (FIGS. 13 and 15).

FIG. 13 is a perspective view of the expansion bottom plate 17 in the normal state and at the storage position Q1 seen from the front side. In FIG. 13, the rear seat 3 is at the shunting position P2, and the expansion bottom plate 17 is at the storage position Q1.

In the fourth embodiment, the expansion bottom plate holding mechanism is formed by a second rotary support mechanism 220.

In FIG. 13, the second rotary support mechanism 220 includes a first horizontal shaft 221, a second horizontal shaft 222, and two brackets 223, 223. The first horizontal shaft 221 and the second horizontal shaft 222 are horizontal shafts in the right and left direction. The brackets 223 rotatably support the first horizontal shaft 221 and the second horizontal shaft 222. The first horizontal shaft 221 is provided in an edge of the expansion bottom plate 17 (a front end in FIG. 15). The two brackets 223, 223 are respectively provided in the front end of the stationary bottom plate 7 on the right and left sides.

FIG. 14 is a perspective view of the expansion bottom plate seen from the front side. In FIG. 14, the rear seat 3 is at the shunting position P2, and the expansion bottom plate 17 is between the storage position Q1 and the expansion position Q2. As shown in FIG. 14, the expansion bottom plate 17 is pivotable on the first horizontal shaft 221 and the second horizontal shaft 222 relative to the stationary bottom plate 7.

FIG. 15 is a side view showing the rear seat 3 in the normal state and at the use position P1. The rear seat 3 at the use position P1 is disposed on the expansion bottom plate 17 at the storage position Q1. That is, the rear seat 3 is supported on the stationary bottom plate 7 and the expansion bottom plate 17.

In the fourth embodiment, the seat holding mechanism is formed by a fourth rotary support mechanism 240, and a third guide mechanism 430.

In FIG. 15, the rotary support mechanism 240 is provided with two guide rollers 241, 241. The two guide rollers 241, 241 are provided in a rear end of the seat back plate 31a of the rear seat 3 on the right and left sides. The guide rollers 241 are rotatable on a horizontal shaft in the right and left direction relative to the seat back plate 31a.

In FIG. 15, the third guide mechanism 430 is provided with two guide rails 431, 431. The two guide rails 431, 431 are fixed to the chassis 6 on both the right and left sides of the rear seat 3. The guide rails 431 are straight rails extending in the back and forth direction. The guide rails 431 support the guide rollers 241 movably in the back and forth direction. The guide rails 431 respectively have front end portions 431a and rear end portions 431b. The front end portions 431a are arranged on the front side of the front end of the stationary bottom plate 7.

Figure 16:
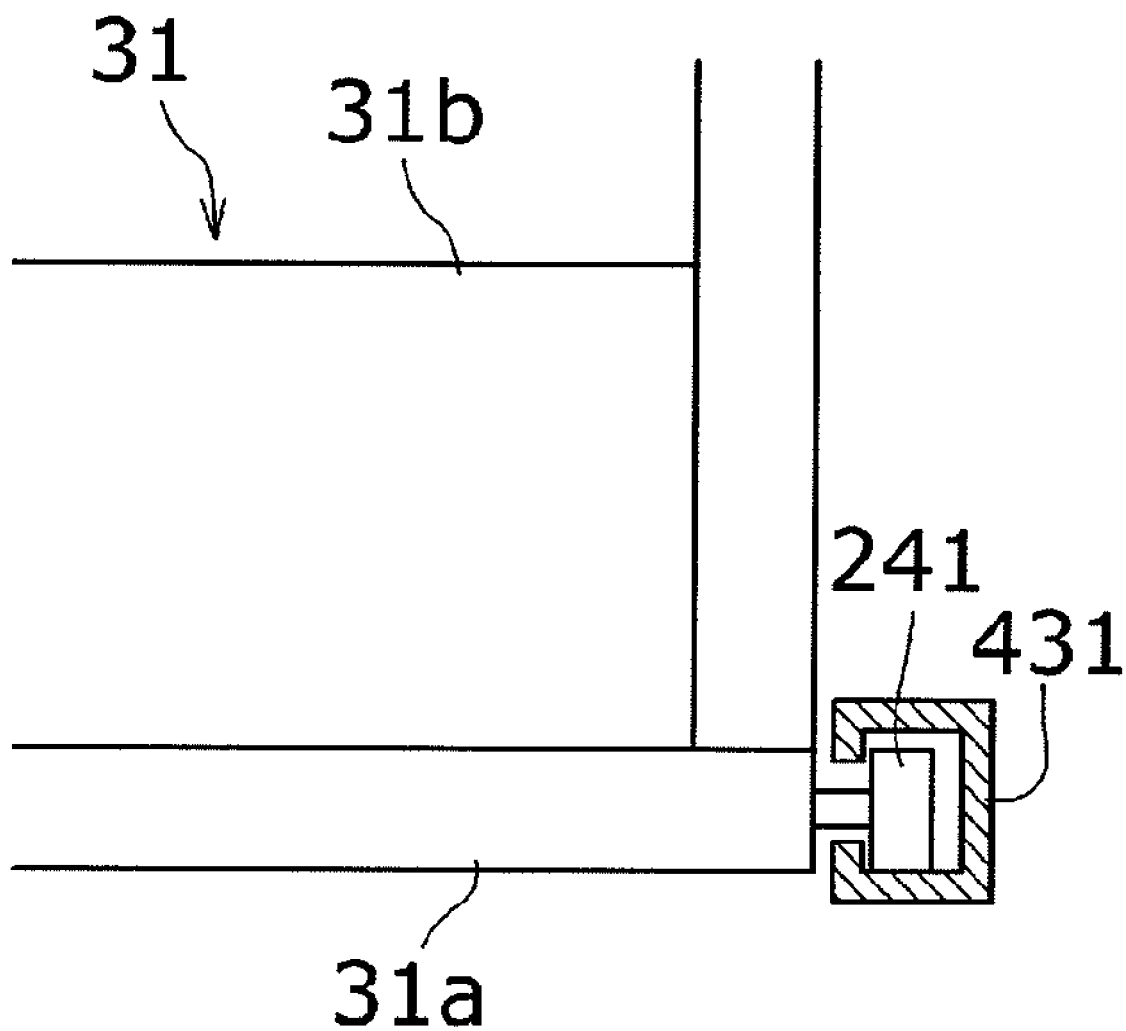
FIG. 16 is a front view showing an end of the rear seat in the right and left direction (the fourth embodiment)

FIG. 16 is a front view showing an end of the rear seat 3 in the right and left direction. A section of the guide rail 431 in a front view is formed in a C shape. The guide roller 241 is arranged inside the guide rail 431 so as not to drop out.

In FIG. 15, the passengers pull the rear seat 3 at the use position P1 to the front side, so that the rear seat 3 is moved forward. A movable range of the guide rollers 241 is from the rear end portions 431b to the front end portions 431a. Before the guide rollers 241 reach the front end portions 431a, the rear seat 3 is placed on the stationary bottom plate 7. At this time, the rear seat 3 cannot be pivoted forward due to the stationary bottom plate 7. Meanwhile, when the guide rollers 241 already reach the front end portions 431a, the rear seat 3 is placed on the front side of the stationary bottom plate 7. At this time, the rear seat 3 can be pivoted forward. The rear seat 3 is pivoted forward by 90 degrees, so that the rear seat 3 reaches the shunting position P2. A double chain line in FIG. 15 shows the rear seat 3 at the shunting position P2.

(Fifth Embodiment)

Figure 17:
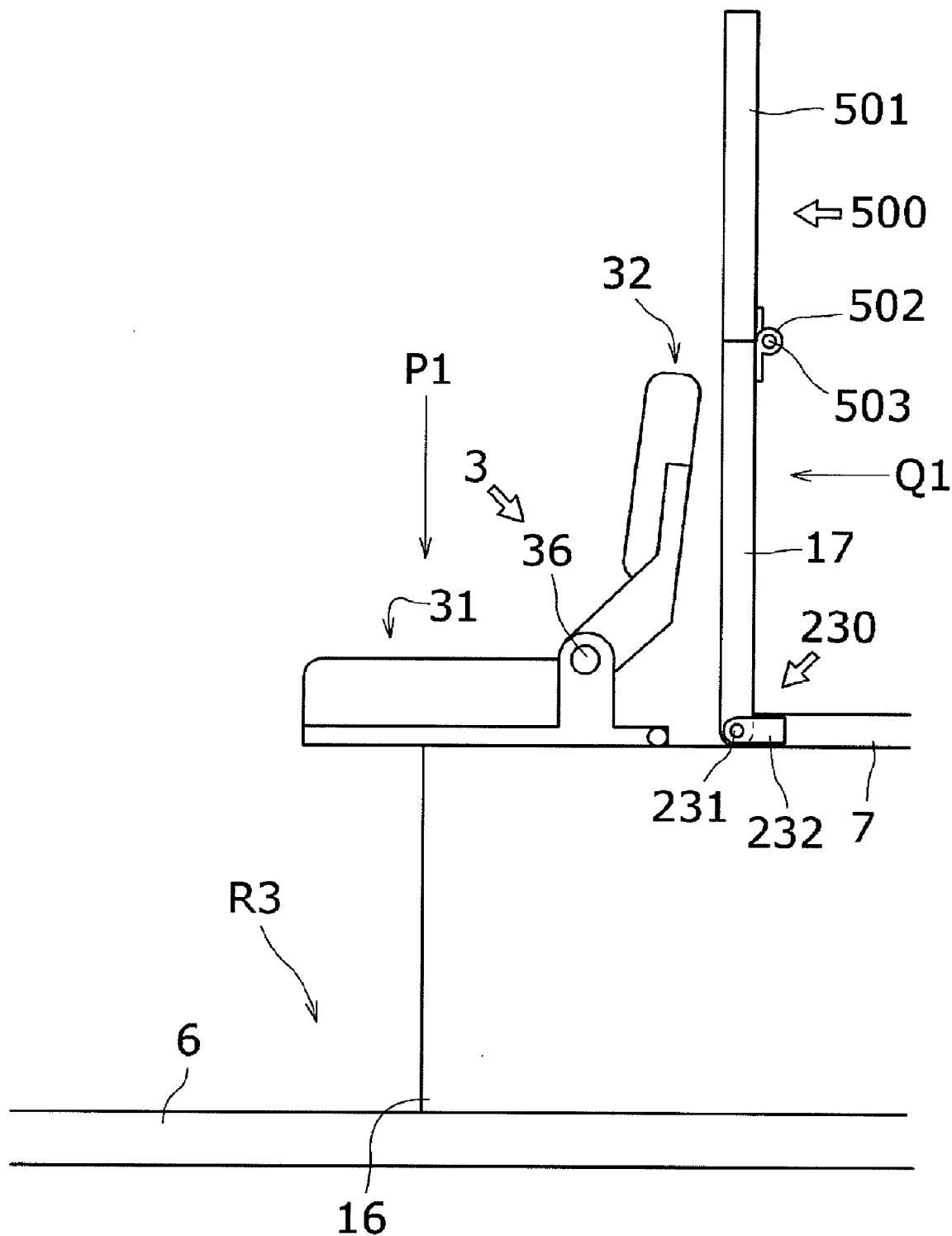
FIG. 17 is a side view showing a peripheral part of a screen 500 in the normal state (a fifth embodiment)
Figure 18:
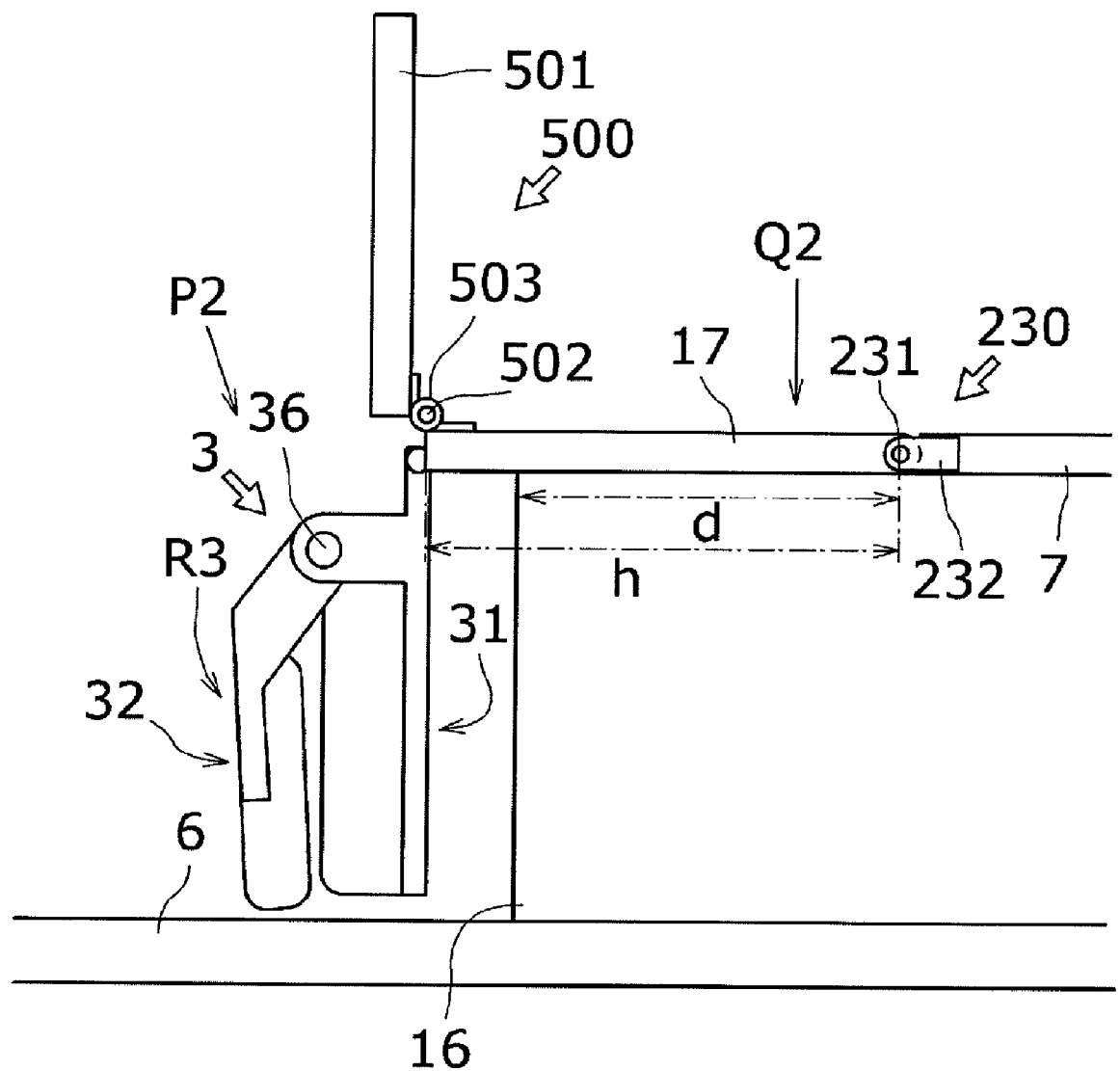
FIG. 18 is a side view showing the peripheral part of the screen 500 in the expanded state (the fifth embodiment)

FIGS. 17 and 18 are views of a screen 500 in the pick-up style utility vehicle 1 in a fifth embodiment seen from the side. The fifth embodiment is the same as the fourth embodiment except a configuration of the expansion bottom plate holding mechanism. That is, the fourth rotary support mechanism 240 and the third guide mechanism 430 are applied as the seat holding mechanism in the fifth embodiment as well as the fourth embodiment (FIGS. 14 to 16). In the fifth embodiment, parts which are common to the first and fourth embodiments will be given the same reference numerals. Description of positional relationships in the fifth embodiment is based on the posture in the normal state (FIG. 17).

FIG. 17 is a side view showing a peripheral part of the screen 500 in the normal state. In the fifth embodiment, the screen 500 includes an upper screen 501 and the expansion bottom plate 17 arranged on the lower side of the upper screen 501. In FIG. 17, the expansion bottom plate 17 is at the storage position Q1. The rear seat 3 at the use position P1 is arranged on the front side of the screen 500. In the fifth embodiment, the rear seat 3 at the use position P1 is disposed on the rear support stand 16. The rear seat 3 at the use position P1 is placed on the front side of the stationary bottom plate 7 in the back and forth direction and at the same height as the stationary bottom plate 7 in the vertical direction. Here, the "same height" indicates that at least part of the rear seat 3 is placed between the upper face and a lower face of the stationary bottom plate 7.

In the fifth embodiment, the expansion bottom plate holding mechanism is formed by a third rotary support mechanism 230.

In FIG. 17, the third rotary support mechanism 230 includes two horizontal shafts 231, 231, and two brackets 232, 232. The horizontal shafts 231 are horizontal shafts in the right and left direction. The brackets 232 rotatably support the horizontal shafts 231. The horizontal shafts 231 are respectively provided in the edge of the expansion bottom plate 17 (a lower end in FIG. 17) on the right and left sides. The two brackets 232, 232 are respectively provided in the front end of the stationary bottom plate 7 on the right and left sides.

The screen 500 is provided with a hinge 502 for supporting the upper screen 501 pivotably on a horizontal shaft 503 in the right and left direction relative to the expansion bottom plate 17. The hinge 502 connects the front end (an upper end) of the expansion bottom plate 17 and an edge (a lower end) of the upper screen.

FIG. 18 is a side view showing the peripheral part of the screen 500 in the expanded state. In FIG. 18, the expansion bottom plate 17 is at the expansion position Q2. Here, the passengers pivot the expansion bottom plate 17 forward by 90 degrees and pivot the upper screen 501 rearward by 90 degrees in order to change the normal state to the expanded state. As a result, the expansion bottom plate 17 is moved from the storage position Q1 to the expansion position Q2. The upper screen 501 is moved to the front side.

When the expansion bottom plate 17 is at the expansion position Q2, the expansion bottom plate 17 projects to the front side of a front end of the rear support stand 16. Positions of the horizontal shafts 231 and length h of the expansion bottom plate 17 are set so that the length h from the horizontal shafts 231 to the front end of the expansion bottom plate 17 is longer than distance d from the horizontal shafts 231 to the front end of the rear support stand 16. Therefore, the expansion bottom plate 17 at the expanded state Q2 is positioned on the upper side of the rear leg room R3.

(Sixth Embodiment)

Figure 19:
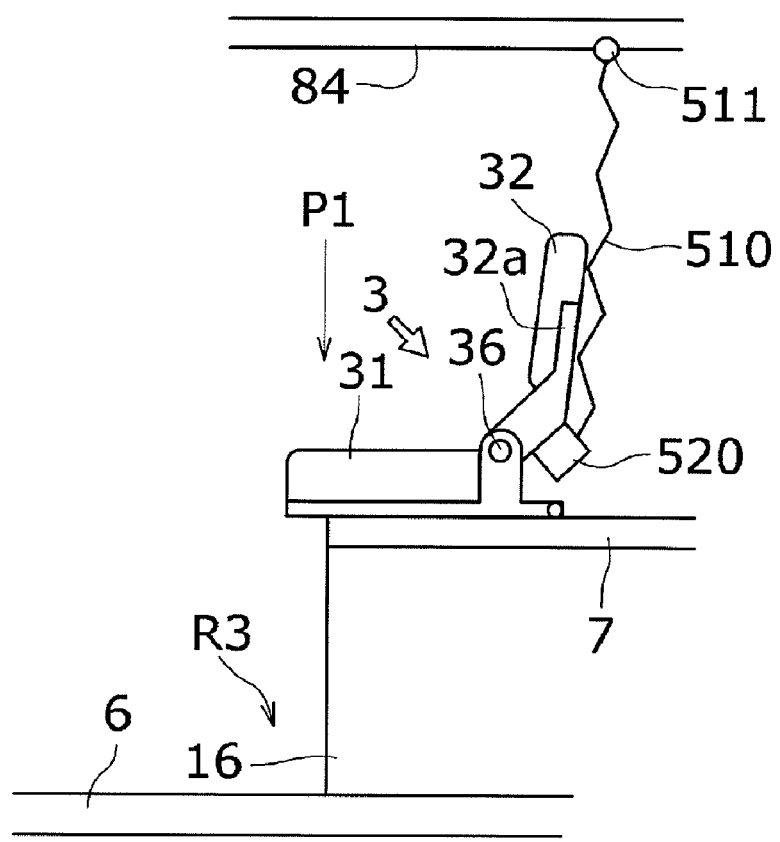
FIG. 19 is a side view showing a rear part of the pick-up style utility vehicle in a first stage (the normal state) (a sixth embodiment)

FIGS. 19 to 22 are side views showing a rear part of the pick-up style utility vehicle 1 in a sixth embodiment. The expansion bottom plate 17 and the expansion bottom plate holding mechanism are not provided in the sixth embodiment. In the sixth embodiment, the fourth rotary support mechanism 240 and the third guide mechanism 430 are applied as the seat holding mechanism as well as the fourth embodiment (FIGS. 14 to 16). In the sixth embodiment, a stretchable screen 510 is applied instead of the screen 5. The sixth embodiment is the same as the first and fourth embodiments with regard to the other configurations. In the sixth embodiment, parts which are common to the first and fourth embodiments will be given the same reference numerals. Description of positional relationships in the sixth embodiment is based on the posture in the normal state (FIG. 19).

In the sixth embodiment, the screen 510 is formed by a stretchable accordion member.

In FIG. 19, the pick-up style utility vehicle 1 is provided with a screen 510, and a storage case 520. The storage case 520 can store the screen 510 and supports the screen 510. The storage case 520 is fixed to a lower end of the backrest back plate 32*a* of the rear seat 3. A fitting portion 511 is provided in an upper end (a front end) of the screen 510. The fitting portion 511 may be a hook, for example. Therefore, the fitting portion 511 can be suspended on the L shape members 84 of the cabin frame 8.

Figure 20:
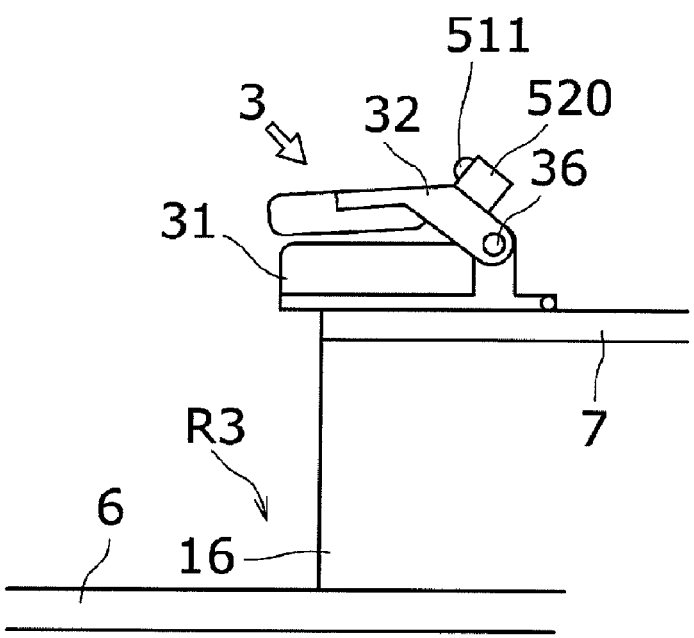
FIG. 20 is a side view showing the rear part of the pick-up style utility vehicle in a second stage (the sixth embodiment)
Figure 21:
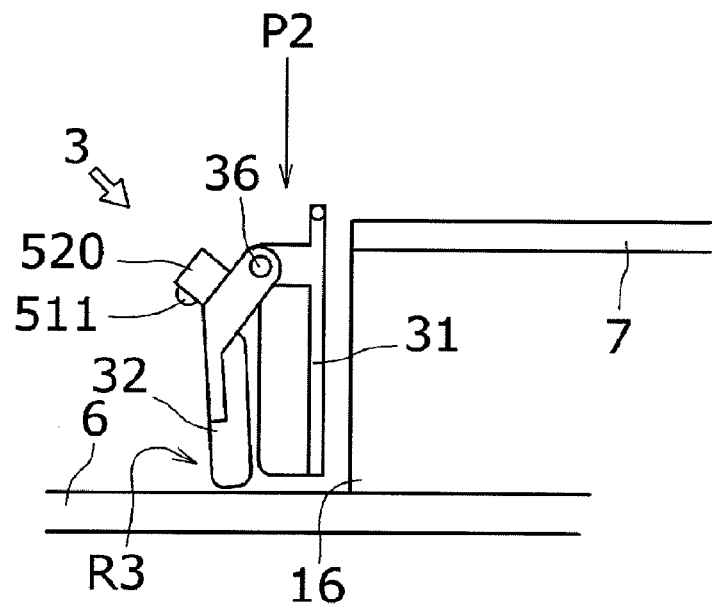
FIG. 21 is a side view showing the rear part of the pick-up style utility vehicle in a third stage (the sixth embodiment)
Figure 22:
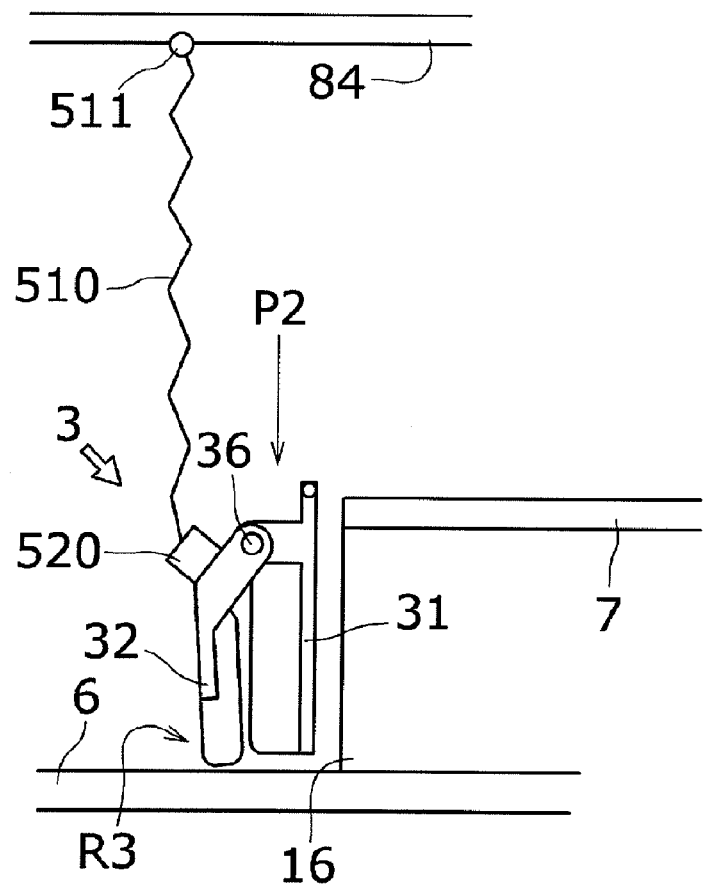
FIG. 22 is a side view showing the rear part of the pick-up style utility vehicle in a fourth stage (the expanded state) (the sixth embodiment)

FIGS. 19 to 22 show four stages from the normal state to the expanded state. FIG. 19 shows a first stage (the normal state), FIG. 20 shows a second stage, FIG. 21 shows a third stage, and FIG. 22 shows a fourth stage (the expanded state).

In FIG. 19, the rear seat 3 is at the use position P1. The fitting portion 511 is fitted with the L shape members 84 right above the backrest 32 of the rear seat 3 at the use position P1. As a result, the screen 510 is developed between the storage case 520 and the fitting portion 511 in a rear end of the rear seat 3 at the use position P1. The screen 510 at this time indicates the screen in the normal state.

In FIG. 20, the screen 510 is stored in the storage case 520. The backrest 32 is pivoted forward, so that the backrest 32 faces the main seat 31.

In FIG. 21, the rear seat 3 is at the shunting position P2.

In FIG. 22, the fitting portion 511 is fitted with the L shape members 84 right above the backrest 32 of the rear seat 3 at the shunting position P2. As a result, the screen 510 is developed between the storage case 520 and the fitting portion 511 in a front part of the rear seat 3 at the shunting position P2. The screen 51 at this time forms a screen in the expanded state.

A plate member which is stretchable by sliding may be used as the screen 510 instead of the accordion member. In this case, the plate member is provided in the rear seat 3 pivotably on a horizontal shaft in the right and left direction so as to be pivoted between the use position P1 and the shunting position P2.

(Seventh Embodiment)

Figure 23:
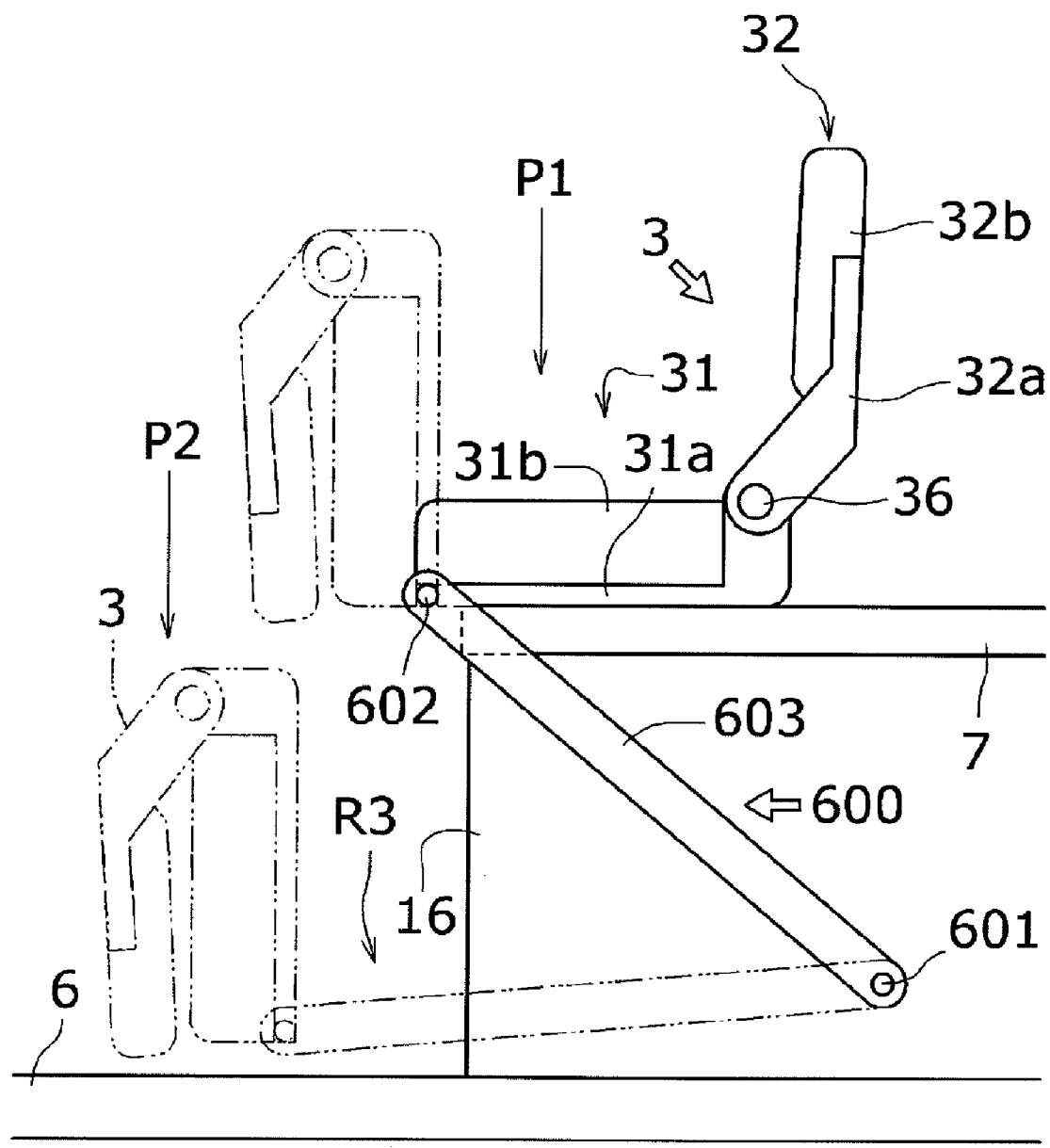
FIG. 23 is a side view showing the rear seat in the normal state and at the use position (a seventh embodiment)

FIG. 23 is a side view of the rear seat 3 in the pick-up style utility vehicle 1 in a seventh embodiment. The seventh embodiment is the same as the first embodiment except configurations of the seat holding mechanism and the expansion bottom plate holding mechanism. In the seventh embodiment, parts which are common to the first embodiment will be given the same reference numerals. Description of positional relationships in the seventh embodiment is based on the posture in the normal state (FIG. 23).

In the seventh embodiment, only the seat holding mechanism will be described. The expansion bottom plate holding mechanism described in the third or fourth embodiment maybe applied as the expansion bottom plate holding mechanism in the seventh embodiment.

FIG. 23 is a side view showing the rear seat 3 in the normal state and at the use position P1. The rear seat 3 at the use position P1 is supported by the stationary bottom plate 7.

In the seventh embodiment, the seat holding mechanism is formed by a second linkage mechanism 600.

In FIG. 23, the second linkage mechanism 600 is provided with two first shafts 601, two second shafts 602, and two link arms 603. Two sets of the first shafts 601, the second shaft 602, and the link arms 603 are respectively arranged in the rear seat 3 on the right and left sides. The first shafts 601 and the second shafts 602 are horizontal shafts in the right and left direction. The first shafts 601 are supported on the rear support stand 16. The second shafts 602 are supported on the front end of the seat back plate 31a of the rear seat 3. The second shafts 602 at the use position P1 are positioned on the front side of the front ends of the stationary bottom plate 7 and the rear support stand 16. The first shafts 601 and the second shafts 602 are rotatably supported by both ends of the link arms 603, respectively.

Upon a change from the use position P1 to the shunting position P2, the passengers firstly make the backrest 32 face the main seat 31. Then, the passengers make the rear seat 3 stand up forward on the second shafts 602. When the rear seat 3 stands up, the rear seat 3 can be pivoted on the first shafts 601. Therefore, the passengers next move the rear seat 3 downward to the shunting position P2 by pivoting the rear seat 3 downward. A double chain line in FIG. 23 shows the rear seat 3 at the shunting position P2. A change from the shunting position P2 to the use position P1 is performed by reverse procedure. That is, the passengers firstly lift the rear seat 3 upward, so that the rear seat 3 is moved to the use position P1. Then, the passengers make the backrest 32 standup relative to the main seat 31.

(Eighth Embodiment)

Figure 24:
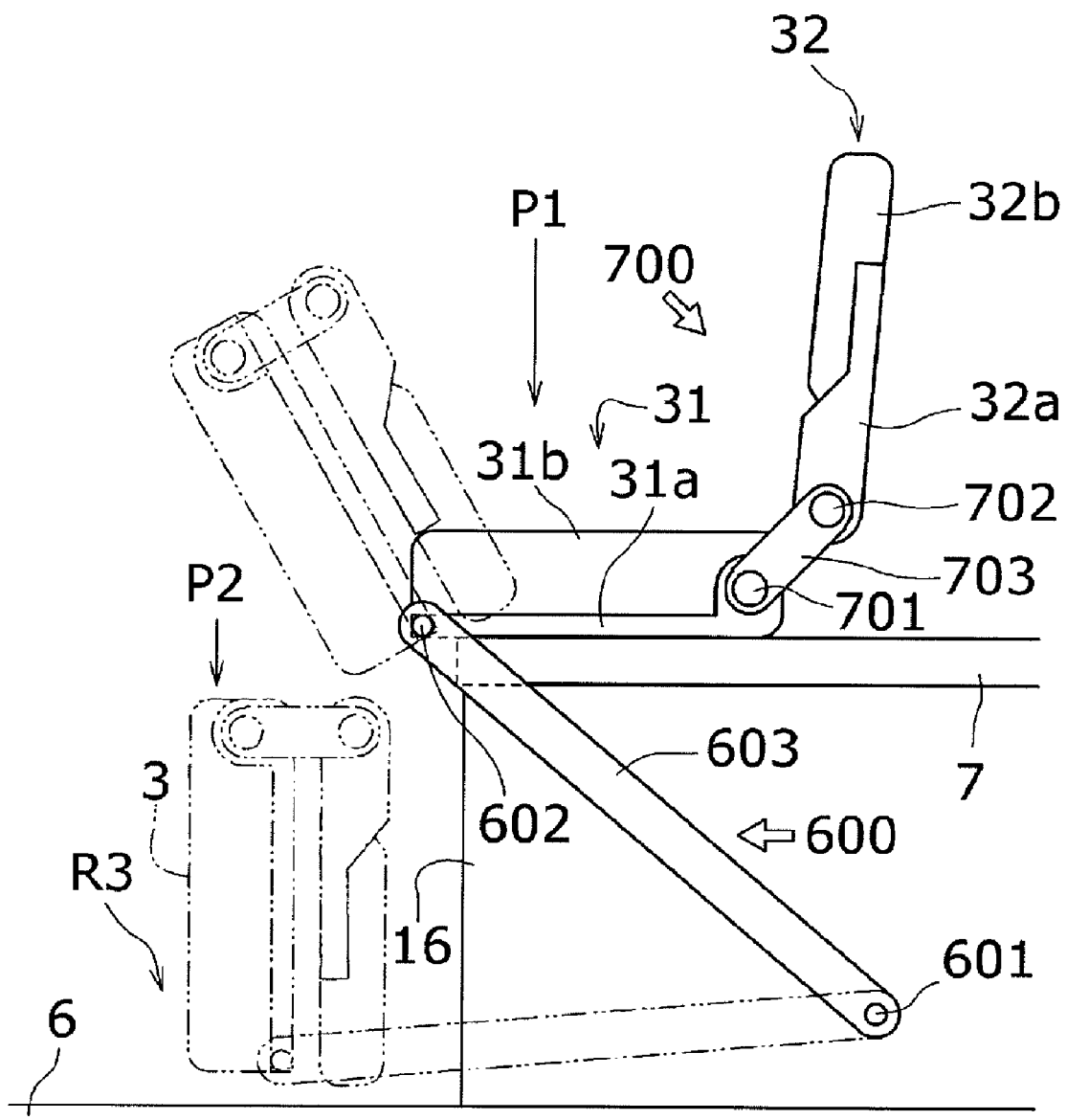
FIG. 24 is a side view showing a rear seat in the normal state and at the use position (an eighth embodiment)

FIG. 24 is a side view of a rear seat 700 in the pick-up style utility vehicle 1 in an eighth embodiment. The eighth embodiment is the same as the seventh embodiment except a configuration of the rear seat 700. In the eighth embodiment, parts which are common to the seventh embodiment will be given the same reference numerals. Description of positional relationships in the eighth embodiment is based on the posture in the normal state (FIG. 24).

FIG. 24 is a side view showing the rear seat 700 at the use position P1. In FIG. 24, the rear seat 700 is provided with the main seat 31, the backrest 32, a first shaft 701, a second shaft 702, and a link 703. The main seat 31 is provided with the seat back plate 31a, and the seat cushion 31b fixed to the seat back plate 31a. The backrest 32 is provided with the backrest back plate 32a, and the backrest cushion 32b fixed to the backrest back plate 32a. The first shaft 701 is provided in the seat back plate 31a. The second shaft 702 is provided in the backrest back plate 32a. The first shaft 701 and the second shaft 702 are respectively rotatably provided in both ends of the link 703. The first shaft 701 and the second shaft 702 are horizontal shafts in the right and left direction. Therefore, the backrest 32 is pivotable relative to the main seat 31.

In the eighth embodiment, the seat holding mechanism is formed by the second linkage mechanism 600 as well as the seventh embodiment. Therefore, a position of the rear seat 700 is changed similarly to the seventh embodiment. A double chain line in FIG. 24 shows the rear seat 3 at the shunting position P2.

Upon the change from the use position P1 to the shunting position P2, the passengers make the main seat 31 stand up forward on the second shafts 602 while making the backrest 32 face the main seat 31. Then, the passengers pivot the rear seat 700 downward, so that the rear seat 700 is moved to the shunting position P2. Here, when the rear seat 700 is at the shunting position P2, the backrest 32 is positioned on the rear side of the main seat 31. Therefore, the rear seat 3 can be stored in the rear leg room R3 at a position which is closer to the rear support stand 16.

(Other Embodiment)

In a case where the seat holding mechanism and the expansion bottom plate holding mechanism are formed independently from each other, a combination of the seat holding mechanism and the expansion bottom plate holding mechanism in one pick-up style utility vehicle 1 can be arbitrarily changed. For example, in the third, fourth and fifth embodiments, the seat holding mechanism (the engagement mechanisms 130) used in the third embodiment can be applied to the fourth embodiment.

The present invention is not limited to the structures of the embodiments above but includes various modifications not departing from a scope of the claims.

EXAMPLES

Examples of the pick-up style utility vehicle 1 will be described with regard to a storage mechanism of the expansion side plates.

Figure 25:
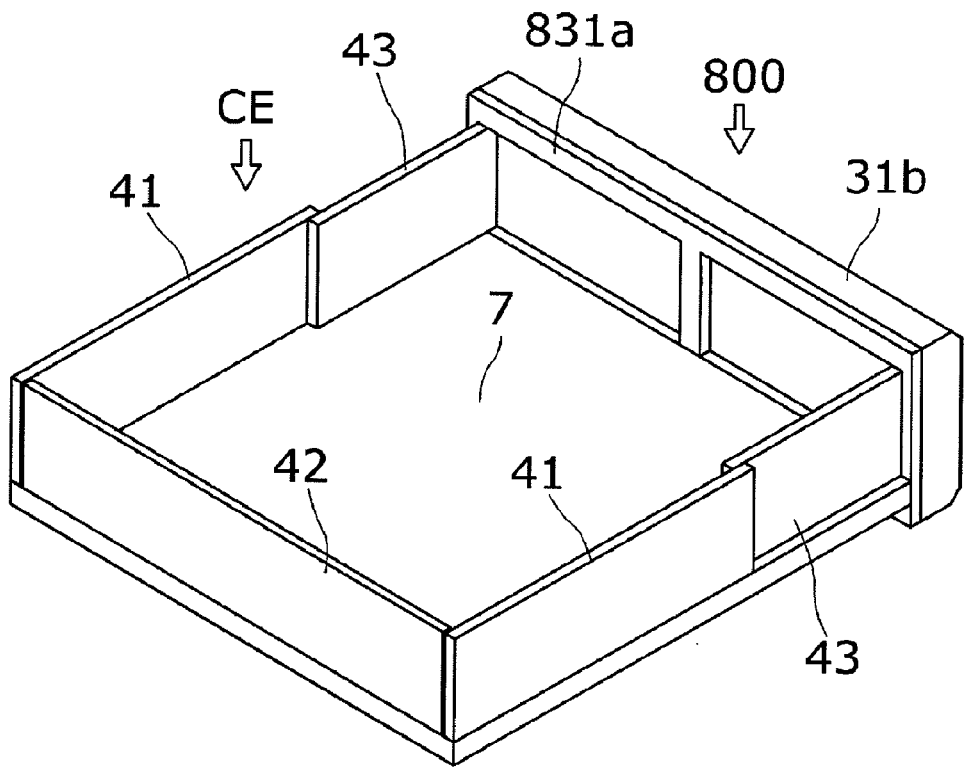
FIG. 25 is a perspective view of the cargo bed in the expanded state seen from the rear side (a first example)
Figure 28:
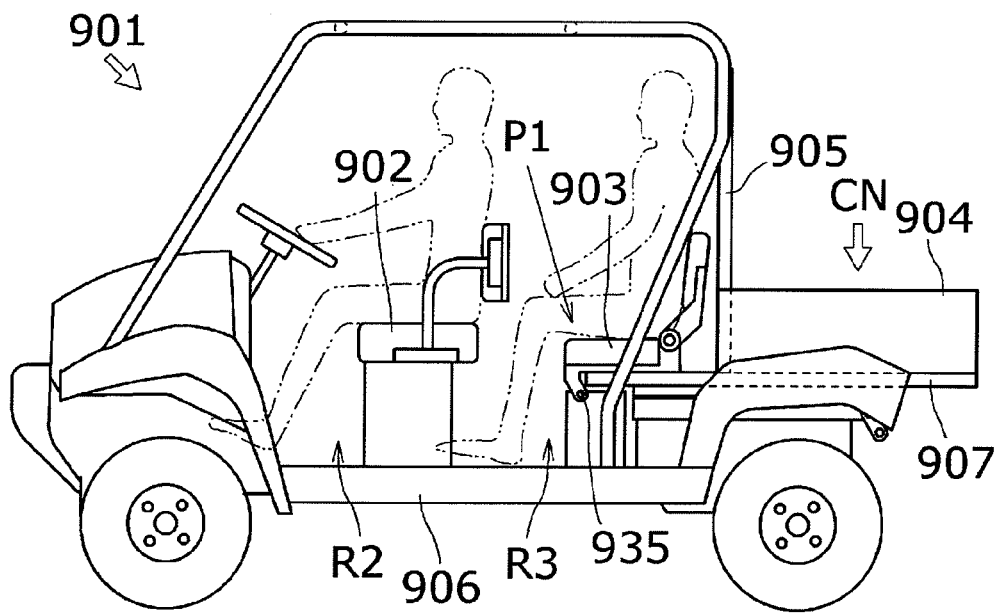
FIG. 28 is a side view showing the pick-up style utility vehicle in the normal state (the related art)
Figure 29:
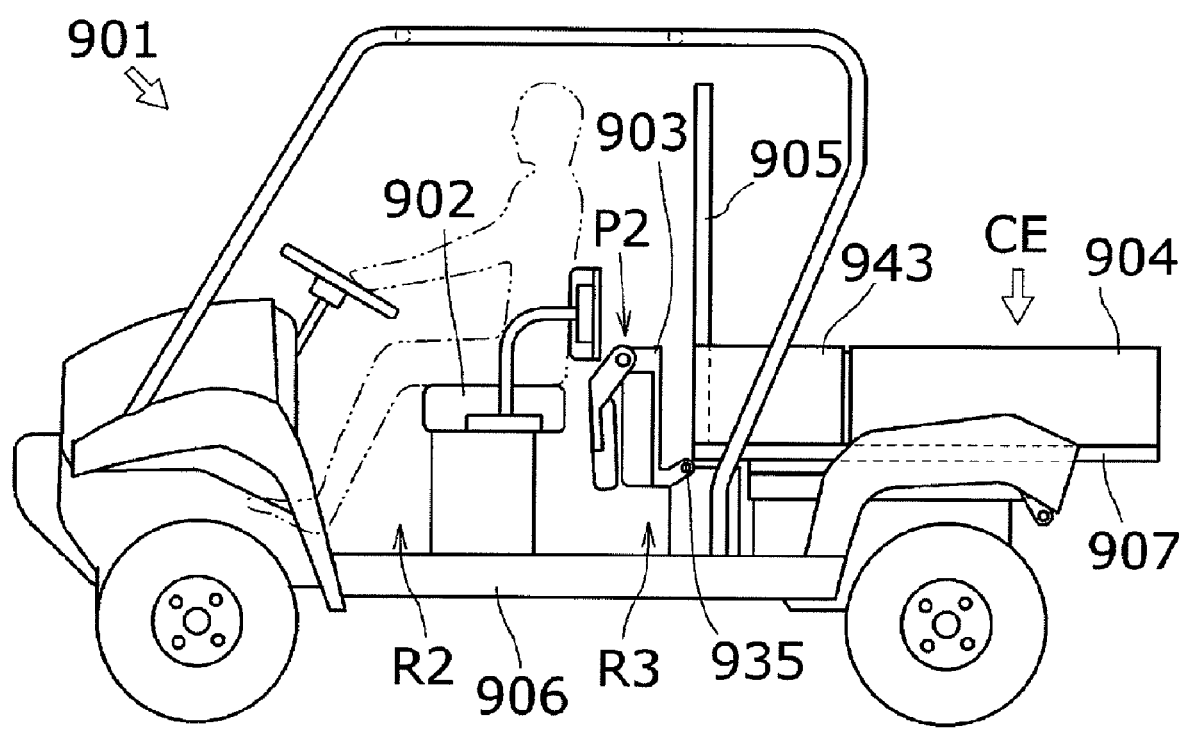
FIG. 29 is a side view showing the pick-up style utility vehicle in the expanded state (the related art).

FIG. 25 is a perspective view of the cargo bed CE in the expanded state seen from the rear side (a first example). In the first example, the two expansion side plates 43, 43 are openably provided in a seat back plate 831a of a rear seat 800. Here, the rear seat 800 has the same configuration as the rear seat 3 except the seat back plate 831a capable of storing the expansion side plates 43. The seat holding mechanism of the rear seat 800 is formed by a horizontal shaft 35 in the right and left direction as well as a conventional example (FIG. 28). Therefore, the rear seat 800 at the shunting position P2 is positioned on the upper side of the stationary bottom plate 7.

With the configuration above, the two expansion side plates 43, 43 can be stored in the rear seat 800 at the use position. The side plates of the expanded cargo bed CE may be formed by the two expansion side plates 43, 43 opened from the rear seat 800 at the shunting position P2.

Figure 26:
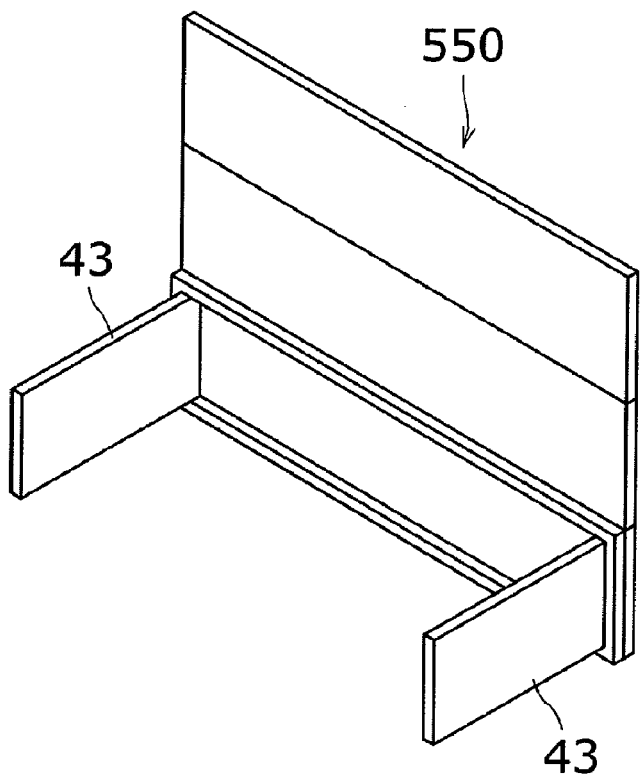
FIG. 26 is a perspective view of a screen seen from the rear side (a second example)
Figure 27:
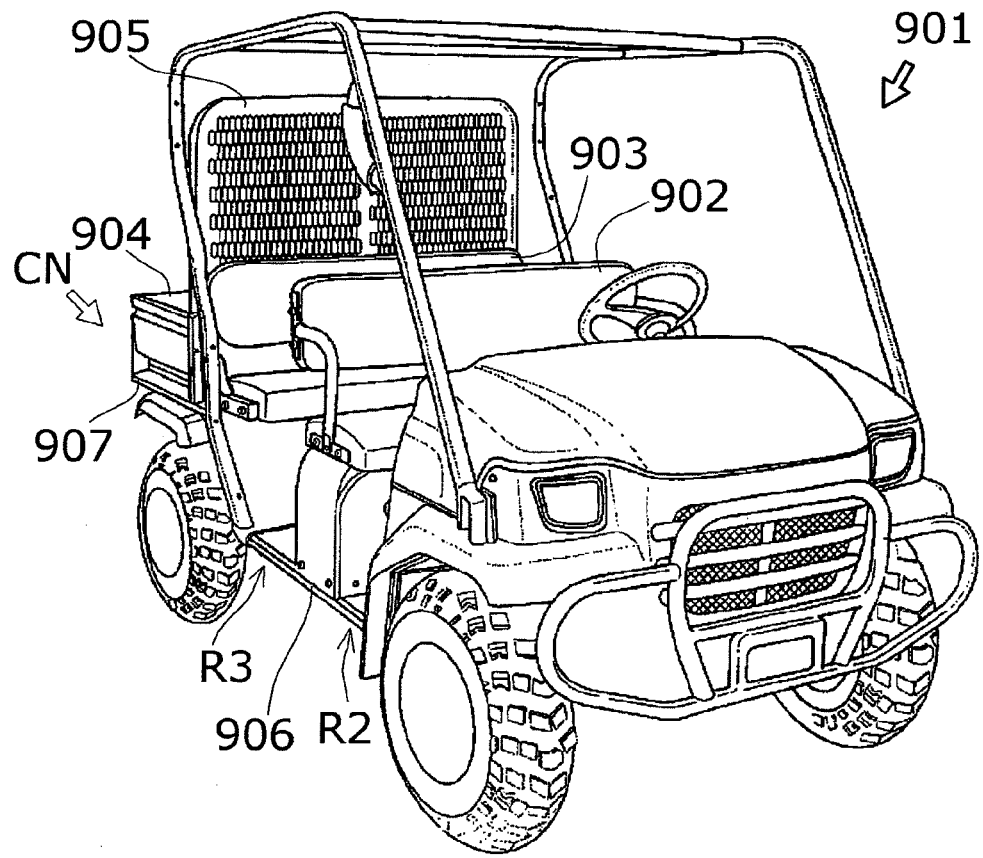
FIG. 27 is a perspective view showing a pick-up style utility vehicle (the related art)

FIG. 26 is a perspective view of a screen 550 seen from the rear side (a second example). In the second example, the expansion side plates 43, 43 are openably provided in the screen 550. The screen 550 has the same configuration as the screen 5 except for having the expansion side plates 43, 43.

With the configuration above, the expansion side plates 43, 43 are closed in the normal state, so that the expansion side plates 43, 43 can be stored in the screen 550. The expansion side plates 43, 43 are opened in the expanded state, so that the side plates of the expanded cargo bed CE can be formed by the two opened expansion side plates 43, 43.

What is claimed is:

1. A pick-up style utility vehicle with an expandable cargo bed, comprising:
    a front seat;
    a rear seat;
    a stationary bottom plate serving as a bottom face of the cargo bed; and
    a linkage mechanism movably connecting the rear seat to the stationary bottom plate,
    wherein the linkage mechanism includes an expansion bottom plate as a second link, a first link rotatably connecting the rear seat to the expansion bottom plate and a third link rotatably connecting the expansion bottom plate to the stationary bottom plate so that the linkage mechanism can hold the rear seat at a use position where the rear seat is positioned above the stationary bottom plate and a shunting position where the rear seat is positioned below the expansion bottom plate.

2. The pick-up style utility vehicle according to claim 1, wherein the rear seat is shunted, at the shunting position, into a rear leg room provided forward of the stationary bottom plate and below a level of a lower surface of the stationary bottom plate.

3. The pick-up style utility vehicle according to claim 1, wherein, at the shunting position, the expansion bottom plate is positioned forward of a front end of the stationary bottom plate such that the expansion bottom plate and the stationary bottom plate are aligned in a horizontal direction.

4. The pick-up style utility vehicle according to claim 1, wherein, at the shunting position, the rear seat hangs from the expansion bottom plate, and, at the use position, the rear seat is positioned over an upper surface of the expansion bottom plate and the expansion bottom plate is positioned over an upper surface of the stationary bottom plate.

* * * * *